(12) United States Patent
Chandran et al.

(10) Patent No.: US 12,160,540 B1
(45) Date of Patent: Dec. 3, 2024

(54) PALMPRINT SCANNING FOR ROLLABLE DISPLAY DEVICE

(71) Applicant: MOTOROLA MOBILITY LLC, Wilmington, DE (US)

(72) Inventors: Amal Chandran, Bangalore (IN); Kolli Kishor, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/320,838

(22) Filed: May 19, 2023

(51) Int. Cl.
*H04M 1/02* (2006.01)
*G06V 40/13* (2022.01)
*H04M 1/72463* (2021.01)

(52) U.S. Cl.
CPC .. *H04M 1/724631* (2022.02); *G06V 40/1318* (2022.01); *H04M 1/0237* (2013.01); *H04M 1/0268* (2013.01)

(58) Field of Classification Search
CPC ............ G06V 40/1318; H04M 1/0237; H04M 1/0268; H04M 1/724631
See application file for complete search history.

(56) References Cited

U.S. PATENT DOCUMENTS

| | | | | |
|---|---|---|---|---|
| 2019/0026527 A1* | 1/2019 | He | ......... | G02B 6/0026 |
| 2019/0130087 A1* | 5/2019 | Mori | ..................... | G06F 3/0488 |
| 2021/0256100 A1* | 8/2021 | Grover | ............... | G06V 40/1376 |
| 2021/0406353 A1* | 12/2021 | Li | .......................... | G06V 40/70 |
| 2022/0148473 A1* | 5/2022 | Kim | ......................... | G06F 1/16 |
| 2022/0187978 A1* | 6/2022 | Kim | ........................ | G01K 3/005 |

* cited by examiner

*Primary Examiner* — Ryan A Lubit
(74) *Attorney, Agent, or Firm* — Isidore PLLC

(57) ABSTRACT

An electronic device, method, and computer program product expedite authentication of a user by capturing a palmprint, without necessarily requiring a dedicated user action. The electronic device monitors for detection of an image via a palmprint scanner, positioned by a translation mechanism, in response to identifying a requirement to authenticate the user. The translation mechanism slides a blade assembly relative to the device housing between extended and retracted positions. The blade assembly includes a blade, a flexible display, and the palmprint scanner sized to cover at least a portion of a back side of the device housing for receiving the palmprint while the blade assembly is at least in the retracted position. The electronic device authenticates the user in response to identifying a palmprint in the image corresponding to an authorized user and presents visual content via the flexible display positioned on a front side of the display housing.

17 Claims, 18 Drawing Sheets

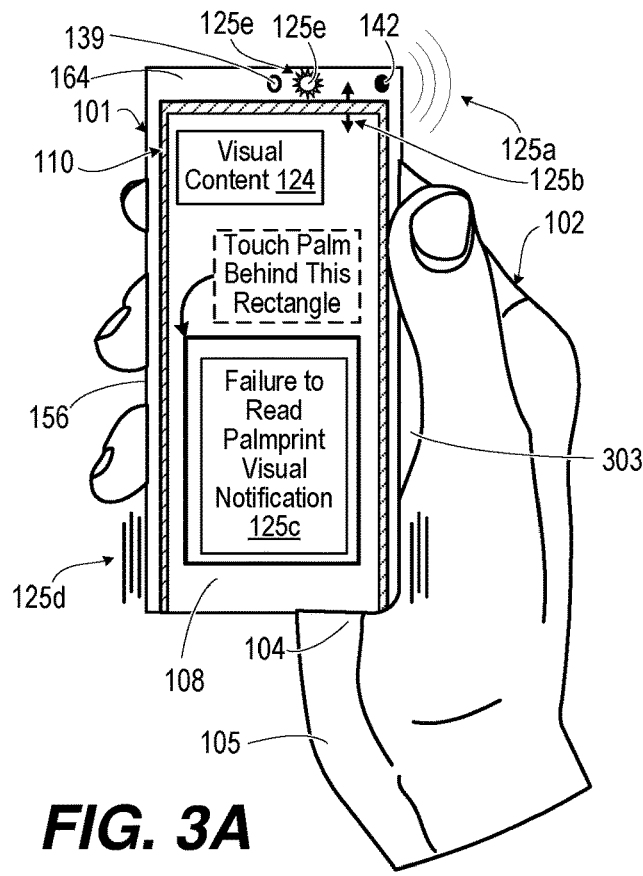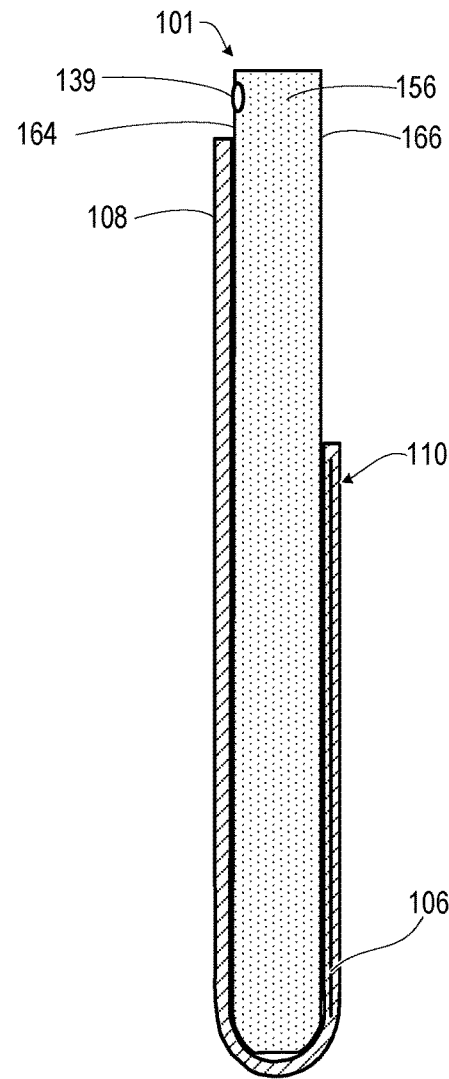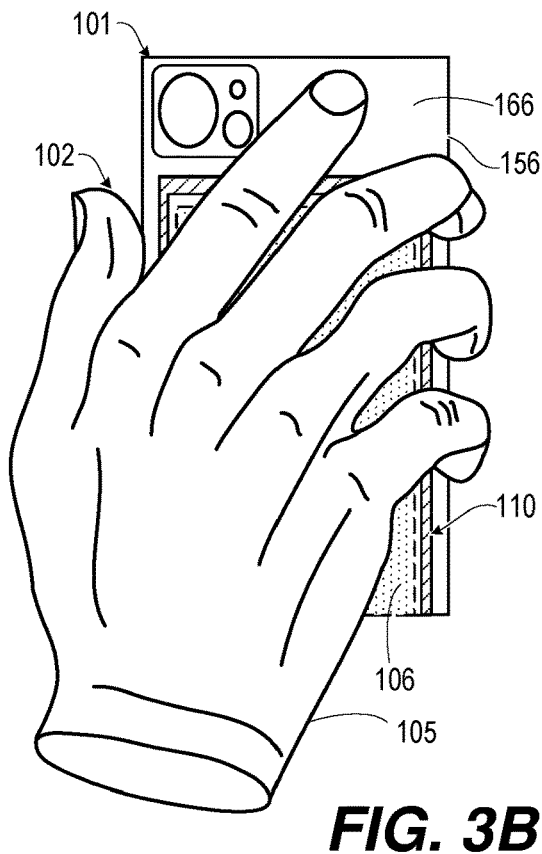
FIG. 3A
FIG. 3B
FIG. 3C

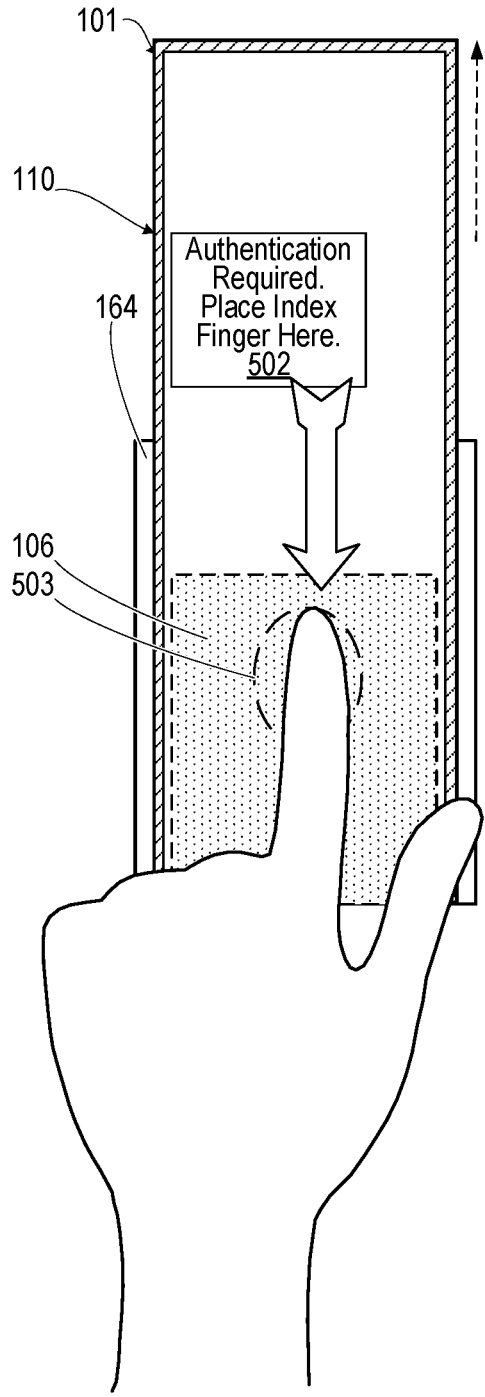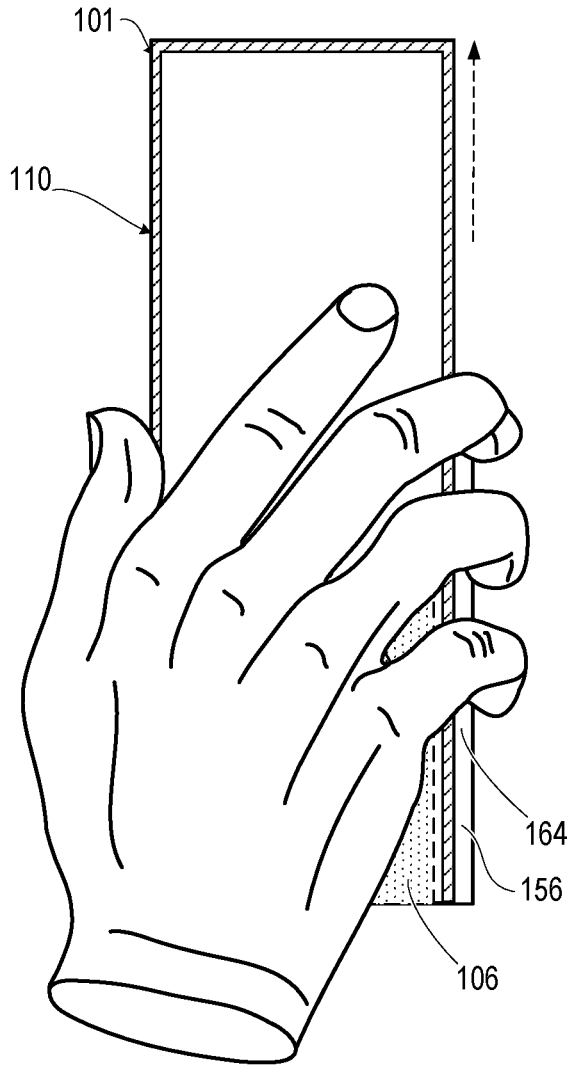
FIG. 5D
FIG. 5E

PALMPRINT SCANNING FOR ROLLABLE DISPLAY DEVICE

BACKGROUND

1. Technical Field

The present disclosure relates generally to communication devices having a sliding or translating form factor, and in particular to communication devices that have a single housing and a rollable flexible display that slides or translates.

2. Description of the Related Art

Portable electronic communication devices, particularly smartphones, have become ubiquitous. People all over the world use such devices to stay connected. These devices have been designed in various mechanical configurations. A first configuration, known as a "candy bar", is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, they can tend to still be bulky when in the closed position due to the fact that two device housings are required. It would thus be desirable to have an improved electronic device and corresponding methods that not only provide a compact geometric form factor but that also allow for the use of a larger display surface area as well. Changing display size is one aspect to addressed. In addition, design forms that change configuration for a smaller size for stowing present a challenge in incorporating biometric sensors for authentication in a predictable, accessible location.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A depicts a front view of an example communication device having a blade assembly with a display screen in a fully retracted position to present a front portion of the blade assembly not extended beyond the device housing and held in the palm of a user with a back side of the blade assembly proximate to a palm of a user holding the device, according to one or more embodiments;

FIG. 3B depicts a back view of the example communication device of FIG. 3A having the blade assembly in a fully retracted position to present a back side that is proximate to a palm of a user, according to one or more embodiments;

FIG. 3C depicts a left side view of the example communication device of FIG. 3A with the blade assembly in a fully retracted position where the front portion of the blade assembly does not extend beyond the device housing, according to one or more embodiments;

FIG. 5D depicts a front view of the example communication device of FIG. 5A with the blade assembly in the fully extended position presenting a prompt to receive a fingerprint, according to one or more embodiments;

FIG. 5E depicts a front view of the example communication device of FIG. 5A with the blade assembly in the fully extended position and supporting an automatic capture of a palmprint when picked up from the front, according to one or more embodiments;

DETAILED DESCRIPTION

Figure 1:
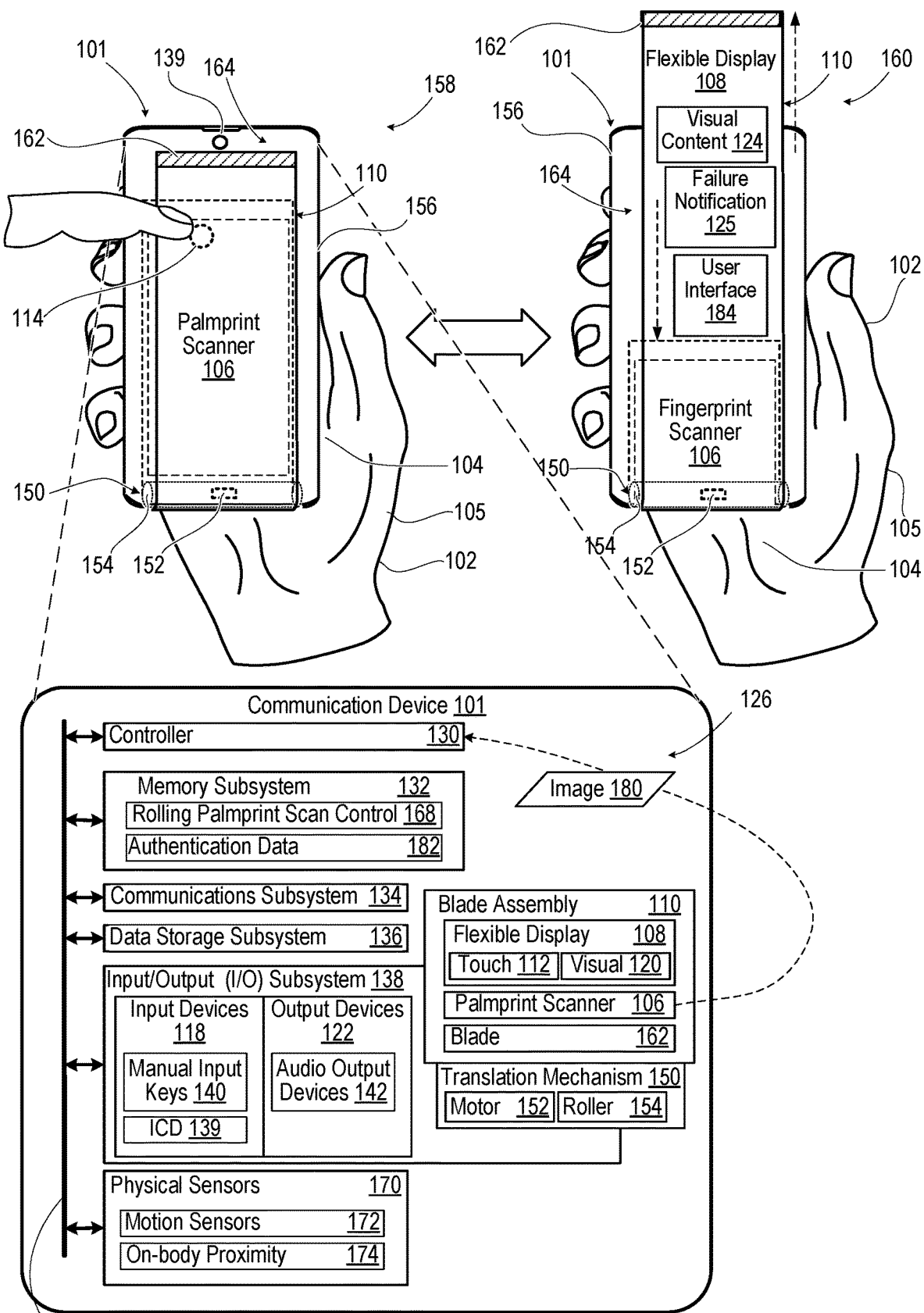
FIG. 1 presents a simplified functional block diagram of a communication device, shown with front views in a retracted position and an at least partially extended position, while automatically capturing a palmprint of a user for authentication, according to one or more embodiments.

According to aspects of the present disclosure, an electronic device, a method, and a computer program product expedite authentication of a user by capturing a palmprint without necessarily requiring a dedicated user action. The electronic device includes a device housing having a front side and a back side and an upright orientation. The electronic device includes a blade assembly slidably coupled to the device housing. The blade assembly includes a blade, a palmprint scanner, and a flexible display attached to the blade. The electronic device includes a translation mechanism operable to slide the blade assembly relative to the device housing between an extended position and a retracted position. The palmprint scanner is integrated/attached underneath a portion of the flexible display. The palmprint scanner is sized to cover at least a portion of the back side of the device housing at which a palm of a hand holding the electronic device in the upright orientation can be scanned. The palmprint scanner selectively captures the palmprint of a user while the blade assembly is in at least one of a partially retracted position and the retracted position. A controller of the electronic device is communicatively coupled to the blade assembly and the translation mechanisms. The controller triggers the palmprint scanner to scan for an image of a palm holding the electronic device in response to identifying a requirement to authenticate a user. The controller authenticates the user in response to identifying, from the image, a palmprint corresponding to an authorized user.

The present disclosure provides palmprint scanning for rollable display devices. The rolling function of a rollable display device is used to expedite palmprint scanning. Part of a flexible display that is incorporated into a blade assembly rolls onto a back side of the electronic device. While holding the electronic device in a hand, a palmprint is presented to a palmprint scanner that is incorporated into the blade assembly. Thus, a user does not need to take any action when authentication is required, providing a level of convenience that exceeds even authentication by fingerprint scanning, which requires a user action. According to aspects of the present disclosure, the blade assembly can support palmprint scanning while the assembly is at any position between a fully extended and a fully retracted position. By incorporating a palmprint scanner into the blade assembly, a user may be authenticated with the palmprint scanning triggered as soon as the controller detects that the electronic device is being picked up and held.

In one or more embodiments, an electronic device includes a motorized mechanism for extending or retracting a primary display unit presented as a blade assembly. A controller of the electronic device may detect motion based on one or more sensors, such as accelerometers, gyroscopes, or other motions detectors. The blade assembly includes a palmprint scanner underneath the flexible display that extends along a portion of the blade assembly that is rolled back onto the back side of the device, such that a palmprint of the user will be presented to the palmprint scanner while holding the electronic device. The controller of the electronic device detects a palmprint of the user when the device is being held in hand. The controller, via the palmprint scanner, scans the palmprint, when required, as the electronic device is being held in a normal handheld position. The controller authenticates the user based on the palmprint and unlocks one or more functions of the electronic device.

In one or more embodiments, the electronic device may extend specified privileges to more than one user, such as a delegated second person. The electronic device may scan a second palmprint when the device is being held by the second person. When the second palmprint is authenticated, privileges delegated to the second person may then unlock one or more functions of the electronic device. Conversely, when a palmprint is scanned that cannot be authenticated, an alien user holding the electronic device may be automatically locked out of one or more functions of the electronic device. A visual or aural notification may be given to the alien user explaining an error or the inability to authenticate the alien user, which may prompt use of alternate methods of authentication. When an alien user is detected that cannot be authenticated as an authorized user, one or more system or application functions are disallowed.

In one or more embodiments, the blade assembly may enable full extension that does not leave a large enough portion of the palmprint scanner on a backside of the electronic device to enable capture of a palmprint. When a need to authenticate the user arises, the controller of the electronic device may provide an indication on the flexible display on the front side of the device, prompting a user to place one of their palm or finger on the front side of the electronic device. The controller then scans a corresponding palmprint or fingerprint of the user.

In one or more embodiments, when a user picks up the stationary electronic device from a surface such as a table, the electronic device may detect an authentication requirement to prepare for the user to access one or more functions of the electronic device. Similarly, the electronic device may detect that the electronic device is being retrieved from a pocket or hand carried enclosure (such as a purse), triggering an authentication requirement. The electronic device may expedite detection of a palmprint of the user's hand that is gripping the electronic device without any dedicated action by the user, expediting the authentication. By the time the electronic device is positioned for viewing by the user of the display, the authentication may be complete.

In one or more embodiments, the electronic device may hold authentication data corresponding to palmprints for more than one user. The authentication data may allow access to the same one or more functions. The authentication data may correspond to or enable different functions to be accessed for each authorized user. In one or more embodiments, the electronic device may disallow all or most functions when an alien user is detected or when an identifiable palmprint is not presented. In response, the electronic device may notify a user of the inability to authenticate, providing instructions to correctly present a palm to the palmprint scanner or providing alternate authentication options. In one or more embodiments, upon detecting an alien user, specific emergency functions may be allowed, such as allowing the alien user to call a primary authorized user, such as to report a lost electronic device. In another example, vital health data may be accessible for first responders who come upon an incapacitated user of the electronic device.

In one or more embodiments, the blade assembly of the electronic device is configured to rotate most or all of the flexible display and palmprint scanner to the front side of the electronic device for full extension of the flexible display. When authentication is required while the flexible display is fully extended, the electronic device may respond to this situation by prompting presentation of a palmprint to the front side of the electronic device. Alternatively, the electronic device may automatically retract the blade assembly until the palmprint scanner can receive a palmprint from the back side of the electronic device and then automatically return the blade assembly to the previous position.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device, configured as a rollable display device and which is referenced herein as communication device 101, and in which the features of the present disclosure are advantageously implemented. Communication device 101 expedites authentication of a user 102 by automatically capturing palmprint 104 of hand 105 of user 102 using palmprint scanner 106 while user 102 is holding communication device 101. Palmprint scanner 106 is incorporated with or attached to flexible display 108 of blade assembly 110. Flexible display 108 includes touch screen 112 that operates as one input device 118 of communication device 101. Touch screen 112 receives touch inputs 114 of user 102. Flexible display 108 includes visual screen 120 that provides one output device 122 of communication device 101. Visual screen 120 presents visual content 124. Visual screen 120 or other output device 122 may present a failure to detect palmprint notification 125. Examples are depicted and described below with regard to FIG. 3A.

With continued reference to FIG. 1, functional components 126 of communication device 101 include controller 130, memory subsystem 132, communications subsystem 134, data storage subsystem 136, and input/output (I/O) subsystem 138. I/O subsystem 138 includes I/O devices such as flexible display 108. I/O subsystem 138 includes other input devices 118, such as image capturing device (ICD) 139 and manual input devices 140 (e.g., keys and buttons), and includes other output devices 122, such audio output device 142. To enable management by controller 130, system interlink 144 communicatively connects controller 130 with memory subsystem 132, communications subsystem 134, data storage subsystem 136, and I/O subsystem 138.

According to aspects of the present disclosure, controller 130 is communicatively coupled to translation mechanism 150, which includes motor 152 and roller 154. Translation mechanism 150 is operable to slide blade assembly 110 relative to device housing 156 of communication device 101 between a retracted position as depicted at 158 and an at least partially extended position as depicted at 160. Blade assembly 110 carries blade 162, which is moved by roller 154, to position palmprint scanner 106 and other portions of flexible display 108 between the fully retracted position and an extended position up to a fully extended position. In one or more embodiments. ICD 139 is exposed on front side 164 in the retracted position but not in the at least partially extended or fully extended positions. Device housing 156 has front side 164 for viewing a portion of flexible display 108 and back side 166 (FIGS. 3B-3C) for receiving palmprint 104. Back side 166 (FIGS. 3B-3C) of device housing 156 is likely to come into contact with palmprint 104 of hand 105 without necessarily requiring a dedicated hand movement by user 102. In addition, palmprint scanner 106 may be able to capture palmprint through most or all of the available positions of blade assembly 110.

In one or more embodiments, controller 130 executes rolling palmprint scan control 168 to configure palmprint scanner 106 for capturing palmprint 104. Palmprint scan control 168 may be program code stored in memory subsystem 132, such as an application, utility, firmware or module executed by at least one microprocessor. Controller 130 may monitor input devices 118, such as manual input devices 140 or touch screen 112 of flexible display 108, to determine an authentication requirement to prompt execution of palmprint scan control 168. Controller 130 may monitor physical sensors 170, such as motion sensors 172 and on-body proximity sensor 174, to determine an authentication requirement. In response to determining that an authentication requirement exists, controller 130 captures image 180 via palmprint scanner 106. Controller 130 authenticates user 102 by referencing authentication data 182 in memory subsystem 132, in response to identifying palmprint 104 in image 180 and matching palmprint to authentication data 182 corresponding to an authorized user. In one or more embodiments, controller 130 unlocks or activates flexible display 108 and enables access to one or more functions of communication device 101 in response to authenticating user 102. i.e., by identifying palmprint 104 in image 180 as corresponding to the authorized user. With access to one or more functions of communication device 101 enabled, controller 130 may activate translation mechanism 150 to position blade assembly 110 to a position between the retracted position and the extended position to present visual content 124 and to present user interface 184 for guiding touch inputs 114 via flexible display 108.

In one or more embodiments, controller 130 determines that authentication is required while blade assembly 110 is in an extended position with palmprint scanner 106 translated to front side 164 of device housing 156. Controller 130 activates translation mechanism 150 to position blade assembly 110 to the retracted position to translate palmprint scanner 106 from front side 164 to back side 166 (FIGS. 3B-3C) of device housing 156 prior to initiating monitoring for image 180 via palmprint scanner 106.

In one or more embodiments, controller 130 determines that authentication is required while blade assembly 110 is in an extended position with palmprint scanner 106 translated to front side 164 of device housing 156. Controller 130 presents a prompt via flexible display 108 to place palm against front side 164 of device housing 156 in response to determining that palmprint scanner 106 is translated onto front side 164 and/or while/whenever blade assembly 110 is in the extended position. Controller 130 captures image 180 via palmprint scanner 106 positioned on the front side of communication device 101.

In one or more embodiments, controller 130 identifies the condition in which authentication of the user is required based on detecting a change from user 102 not attending to communication device 101 to user 102 attending to communication device 101. In one or more particular embodiments, controller 130 determines that user 102 is attending to communication device 101 based on receiving touch inputs 114 via touch screen 112. In one or more particular embodiments, controller 130 determines that user 102 is attending to communication device 101 in response to detecting that communication device 101 is moving, based on detecting movement by motion sensors 172.

Figure 2:
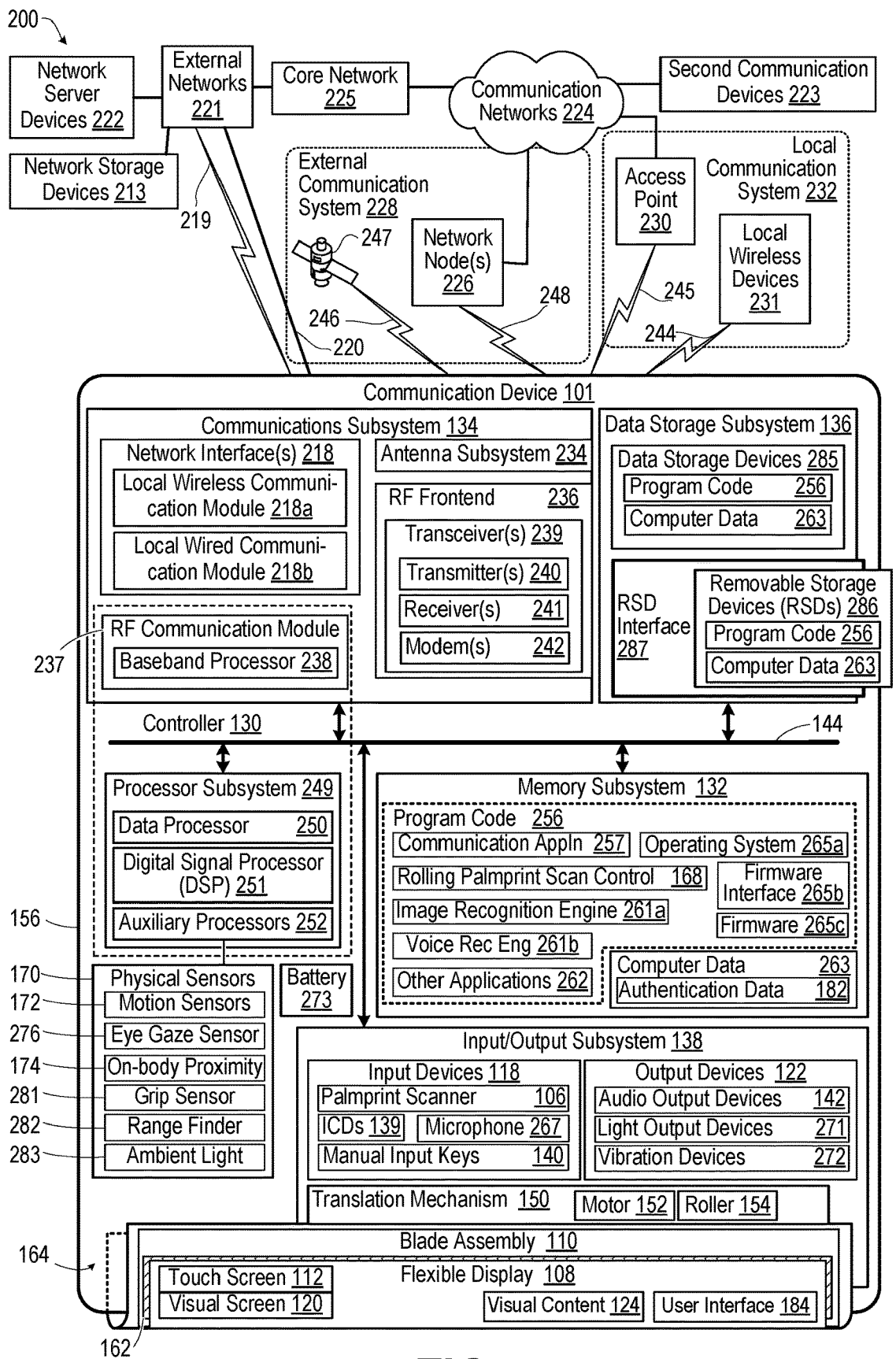
FIG. 2 depicts a functional block diagram of a communication environment including the communication device of FIG. 1, according to one or more embodiments.

FIG. 2 is a functional block diagram of a communication environment 200 that includes communication device 101 and in which additional features, such as wireless communication, of the present disclosure are advantageously implemented. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the additional specific component makeup and the associated functionality of the presented components. System interlink 144 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 144) are illustrated in FIGS. 1-2, it is to be understood that more, fewer, or different interconnections may be present in other embodiments.

In one or more embodiments, communications subsystem 134 may include one or more network interfaces 218, such as local wireless communication module 218a and local wired communication module 218b, to communicatively couple communication device 101 respectively via wireless connection 219 or network cable 220 to external networks 221. Communication device 101, via external networks 221, may connect to network storage devices 213 that store computer data and to network server devices 222 that facilitate access to network storage devices 213. Network server devices 222 may have identical or similar components and functionality as described above for communication device 101. Communication device 101 may communicate with second communication devices 223 via external networks 221 or via communication networks 224 that are supported by core networks 225. Network interface(s) 218 may include a network interface controller (NIC) and support one or more network communication protocols. External networks 221 can include a local area network (LAN), a campus area network (CAN), a metropolitan area network (MAN), or a wide area network (WAN). For example, wireless connection 219 and network cable 220 can be an Ethernet connection/cable.

In one or more embodiments, communications subsystem 134 may include additional functionality for communicating, using a cellular connection, with network node(s) 226 of external communication system 228 and for communicating, using a wireless connection, with wireless access point 230 or local wireless devices 231 of local communication system 232. Communications subsystem 134 includes antenna subsystem 234. Communications subsystem 134 includes radio frequency (RF) front end 236 and RF communication module 237 having baseband processor 238. RF front end 236 includes transceiver(s) 239, which includes transmitter(s) 240 and receiver(s) 241. RF front end 236 further includes modem(s) 242. Baseband processor 238 of RF communication module 237 communicates with controller 130 and RF front end 236. Baseband processor 238 operates in a baseband frequency range to encode data for transmission and decode received data, according to a communication protocol. Modem(s) 242 modulates baseband encoded data from RF communication module 237 onto a carrier signal to provide a transmit signal that is amplified by transmitter(s) 240. Modem(s) 242 demodulates each signal received using antenna subsystem 234 from external communication system 228 or local communication system 232. The received signal is amplified and filtered by receiver(s) 241, which demodulates received encoded data from a received carrier signal.

In one or more embodiments, controller 130, via communications subsystem 134, performs multiple types of cellular over-the-air (OTA) or wireless communication with local communication system 232. Communications subsystem 134 can communicate via an OTA connection 244 with local wireless devices 231. In an example, OTA connection 244 is a Bluetooth connection, or other personal access network (PAN) connection. In one or more embodiments, communications subsystem 234 communicates with one or more locally networked devices via a wireless local area network (WLAN) link 245 supported by access point 230. In one or more embodiments, access point 230 supports communication using one or more IEEE 802.11 WLAN protocols. Access point 230 is connected to communication networks 224 via a cellular or wired connection. In one or more embodiments, communications subsystem 134 receives downlink channels 246 from GPS satellites 247 to obtain geospatial location information. Communications subsystem 134 can communicate via an over-the-air (OTA) cellular connection 248 with network node(s) 226.

Controller 130 includes processor subsystem 249, which includes one or more central processing units (CPUs), depicted as data processor 250. Processor subsystem 249 can include one or more digital signal processors 251 that can be integrated with data processor 250. Processor subsystem 249 can include other processors that are communicatively coupled to data processor 250, such as baseband processors 238 of communication module 237. In another example, auxiliary processors 252 may act as a low power consumption, always-on sensor hub for physical sensors 170. In one or more embodiments that are not depicted, controller 130 can further include distributed processing and control components that are external to housing 156 or grouped with other components, such as I/O subsystem 138. Data processor 250 is communicatively coupled, via system interlink 144, to memory subsystem 132. In one or more embodiments, data processor 250 is communicatively coupled via system interlink 144 to communications subsystem 134, data storage subsystem 136 and I/O subsystem 138. Controller 130 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 132 stores program code 256 for execution by processor subsystem 249 to provide the functionality described herein. Program code 256 includes applications such as communication application 257 that receives or generates visual content 124 or user interface 184. Program code 256 includes rolling palmprint scan control 168 that may be software or firmware that controls activation of palmprint scanner 106 for authenticating palmprint 104 (FIG. 1). In one or more embodiments, rolling palmprint scan control 168 may control translation mechanism 150 that positions blade assembly 110 at least in instances where repositioning of the palmprint scanner 106 is required. Program code 256 may include applications or utilities, such as image recognition engine 261*a* and voice recognition engine 261*b*, and other applications 262. In one or more embodiments, several of the described aspects of the present disclosure are provided via executable program code of applications executed by controller 130. In one or more embodiments, program code 256 may be integrated into a distinct chipset or hardware module as firmware that operates separately from executable program code. Portions of program code 256 may be incorporated into different hardware components that operate in a distributed or collaborative manner. Implementation of program code 256 may use any known mechanism or process for doing so using integrated hardware and/or software, as known by those skilled in the art. Program code 256 may access, use, generate, modify, store, or communicate computer data 263, such as authentication data 182.

Computer data 263 may incorporate "data" that originated as raw, real-world "analog" information that consists of basic facts and figures. Computer data 263 includes different forms of data, such as numerical data, images, coding, notes, and financial data. Computer data 263 may originate at communication device 101 or be retrieved by communication device 101. Communication device 101 may store, modify, present, or transmit computer data 263. Computer data 263 may be organized in one of a number of different data structures. Common examples of computer data 263 include video, graphics, text, and images as discussed herein. Computer data 263 can also be in other forms of flat files, databases, and other data structures.

Memory subsystem 132 further includes operating system (OS) 265*a*, firmware interface 265*b*, such as basic input/output system (BIOS) or Uniform Extensible Firmware Interface (UEFI), and firmware 265*c*, which may be considered to be program code 256.

I/O subsystem 138 includes input devices 118, output devices 122, and I/O devices, such as flexible display 108. Blade assembly 110 includes blade 162 which supports flexible display 108. Input devices 118 may include palmprint scanner 106, image capturing devices (ICDs) 139, manual input devices 140 (e.g., keys and buttons), microphone 267. Output devices 122 may include audio output devices 142, light output devices 271, and vibration device 272. Vibration device 272 oscillates a mass such as battery 273 to create vibratory alerts.

Physical sensors 170 provides additional contextual indications of the use and environment of communication device 101. Examples of physical sensors 170 include motion sensors 174 or motion detectors such as accelerometers that detect when communication device 101 is being moved by user 102 (FIG. 1) or is stationary on a surface, such as table. Physical sensors 170 may include eye gaze sensor 276 that detects whether user 102 (FIG. 1) is looking toward communication device 101. Physical sensors 170 may include on-body proximity sensors 174 that detects proximity to a lossy dielectric mass (i.e., hand 105 or body of user 102 (FIG. 1), such as when communication device 101 is placed in a pocket. Physical sensors 170 may include grip sensors 281 exteriorly presented on housing 156 detecting when communication device 101 is being held in hand 105 of user 102 (FIG. 1). Physical sensors 170 may include range finder 282 and ambient light sensor 283. Controller 130 automatically responds to contexts, determined at least in part on physical sensors 170, by positioning blade assembly 110 of communication device 101 in one configuration from among: (i) a retracted configuration when communication device 101 is stowed in a pocket, (ii) a partially extended peck configuration when a notification is received, or (iii) an extended configuration when communication device 101 is in hand 105 of user 102 (FIG. 1) or when a larger display output is required for presenting content.

Data storage subsystem 136 of communication device 101 includes data storage device(s) 285. Controller 130 is communicatively connected, via system interlink 144, to data storage device(s) 285. Data storage subsystem 136 provides program code 256 and computer data 263 stored on non-volatile storage that is accessible by controller 130. For example, data storage subsystem 136 can provide a selection of program code 256 and computer data 263. These applications can be loaded into memory subsystem 132 for execution/processing by controller 130. In one or more embodiments, data storage device(s) 285 can include hard disk drives (HDDs), optical disk drives, and/or solid-state drives (SSDs), etc. Data storage subsystem 136 of communication device 101 can include removable storage device(s) (RSD(s)) 286, which is received in RSD interface 287. Controller 130 is communicatively connected to RSD 286, via system interlink 144 and RSD interface 287. In one or more embodiments, RSD 286 is a non-transitory computer program product or computer readable storage device. Controller 130 can access data storage device(s) 285 or RSD 286 to provision communication device 101 with program code 256.

FIG. 3A depicts a front view of communication device 101 having blade assembly 110 in a fully retracted position to present a front portion of the blade assembly not extended beyond the device housing and being held in palm 303 of user 102 with back side 166 (FIGS. 3B-3C) of device housing 156 against palm 303 of user 102. Image capturing device (ICD) 139 is exposed while blade assembly 110 is in the fully retracted position. In addition, the size of communication device 101 is reduced making communication device 101 easier to carry and stow. Blade assembly 110, which includes flexible display 108, is fully supported by, and fully aligned with, device housing 156. Flexible display 108 may present visual content 124.

In an example, in FIG. 3A, hand 105 of user 102 is gripping communication device 101 such that palm 303 is laterally misaligned and is not contacting back side 166. In one or more embodiments, communication device 101 may attempt to acquire palmprint 104 by translating blade assembly 110, such as retracting to a partially retracted position or a fully retracted position. Alternatively, or in addition, communication device 101 may present "failure to detect palmprint" notification 125 (FIG. 1) at a current position of the blade assembly 110. The notification 125 may also prompt user 102 to reposition hand 105, such as depicted in FIG. 3B, so that palm 303 is centered on, and in contact with, blade assembly 110 at back side 166 of electronic device 101. With continued reference to FIG. 3A, in an example, notification 125 (FIG. 1) may include an audio alert or instruction 125a presented by audio output device 142. In another example, notification 125 (FIG. 1) may include display position jiggle 125b presented by movement of blade assembly 110. Display position jiggle 125b may be a small movement in either a retraction or extension direction. Display position jiggle 125b may be a series of alternating small movements in both retraction and extension directions. In an additional example, notification 125 (FIG. 1) may include visual direction cue and instructions 125c presented by flexible display 108. In an example, text may indicate the failure. An annotation may provide a target shape such as a box that indicates where the palmprint scanner is on the back side as viewed from the front. A direction arrow may draw attention to the annotation with positioning instructions such as "touch palm behind this rectangle." In one or more embodiments, communication device 101 may detect a direction (e.g., . . . left/right/up/down) that the palm 303 should be moved with this information included in the visual or verbal instructions and indications. In an example, an incomplete palmprint is detected on one side of palmprint scanner 106 that prevents an accurate authentication. A smaller number of key features of the palmprint 104 are captured, reducing accuracy. In a further example, notification 125 (FIG. 1) may include vibratory alert 125d presented by vibration devices 272 (FIG. 2). In yet another example, notification 125 (FIG. 1) may include light alert 125e presented by light output devices 271 (FIG. 2).

FIG. 3B depicts a back view of communication device 101 having blade assembly 110 in a fully retracted position to present back side 166 that is proximate to a palm of user 102. Hand 105 of user 102 is holding communication device 101, providing an opportunity for communication device 101 to automatically authenticate user 102. The portion of blade assembly 110 aligned with back side 166 of device housing 156 is substantially covered by palmprint scanner 106, enabling automatic authentication to be performed for a number of different positions of hand 105.

FIG. 3C depicts a left side view of communication device 101 having blade assembly 110 in a fully retracted position, thus not extending beyond device housing 156. Palmprint scanner 106 is positioned on back side 166 of device housing 156. Blade assembly 110 is relatively thin, providing communication device 101 that is easy to carry and stow. In the retracted position, a full length of blade assembly 110 is positioned against device housing 156 to provide structural support to blade assembly 110. ICD 139 on front side 164 is exposed and operable.

Figure 4A:
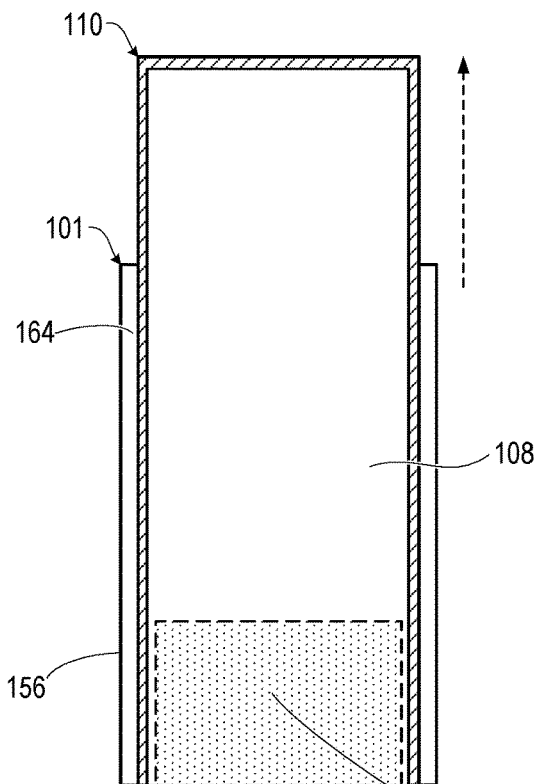
FIG. 4A depicts a front view of the example communication device having the blade assembly in a partially extended position, increasing display area of the flexible display on the front side of the device housing, according to one or more embodiments.
Figure 4B:
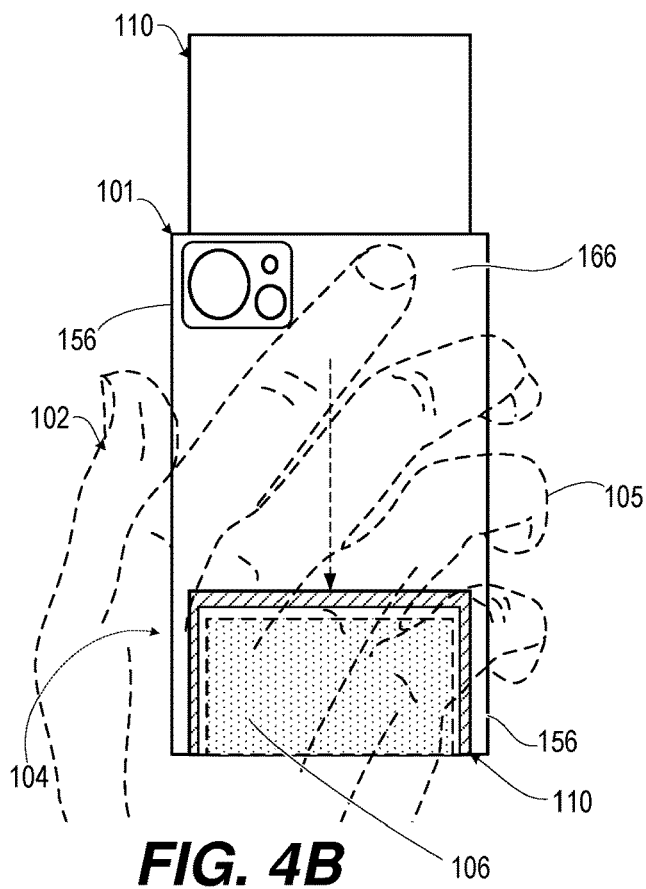
FIG. 4B depicts a back view of the example communication device of FIG. 4A with the blade assembly in the partially extended position while the device is being held in the palm of the user, according to one or more embodiments.
Figure 4C:
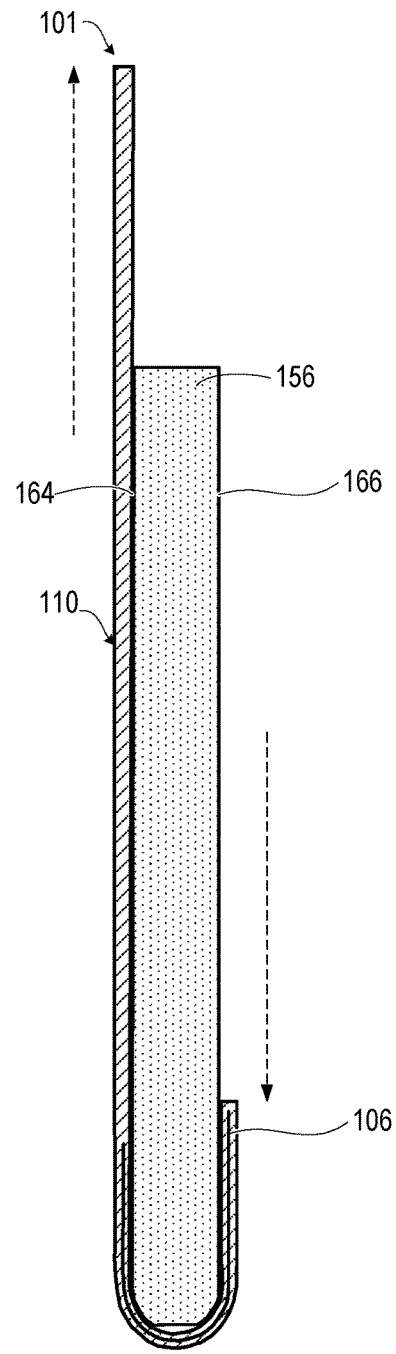
FIG. 4C depicts a left side view of the example communication device of FIG. 4A with the blade assembly in the partially extended position beyond the device housing, according to one or more embodiments.

FIG. 4A depicts a front view of communication device 101 having blade assembly 110 in a partially extended position, increasing display area of flexible display 108 on front side 164 of device housing 156. A portion of palmprint scanner 106 has translated onto front side 164, presenting an opportunity for prompting presentation of a fingerprint if unable to capture a palmprint on back side 166 (FIGS. 4B-4C) of communication device 101, as further illustrated by FIG. 5D. FIG. 4B depicts a back view of communication device 101 having blade assembly 110 in the partially extended position with back side 166 of device housing 156 against palmprint 104 of user 102. A portion of palmprint scanner 106 remains on back side 166, providing an opportunity for capturing and automatically authenticating palmprint 104 (FIG. 1). FIG. 4C depicts a left side view of communication device 101 having blade assembly 110 in the partially extended position. Palmprint scanner 106 is flexible, rolling around device housing 156 from back side 166 to front side 164 as blade assembly 110 translates to an extended position.

Figure 5A:
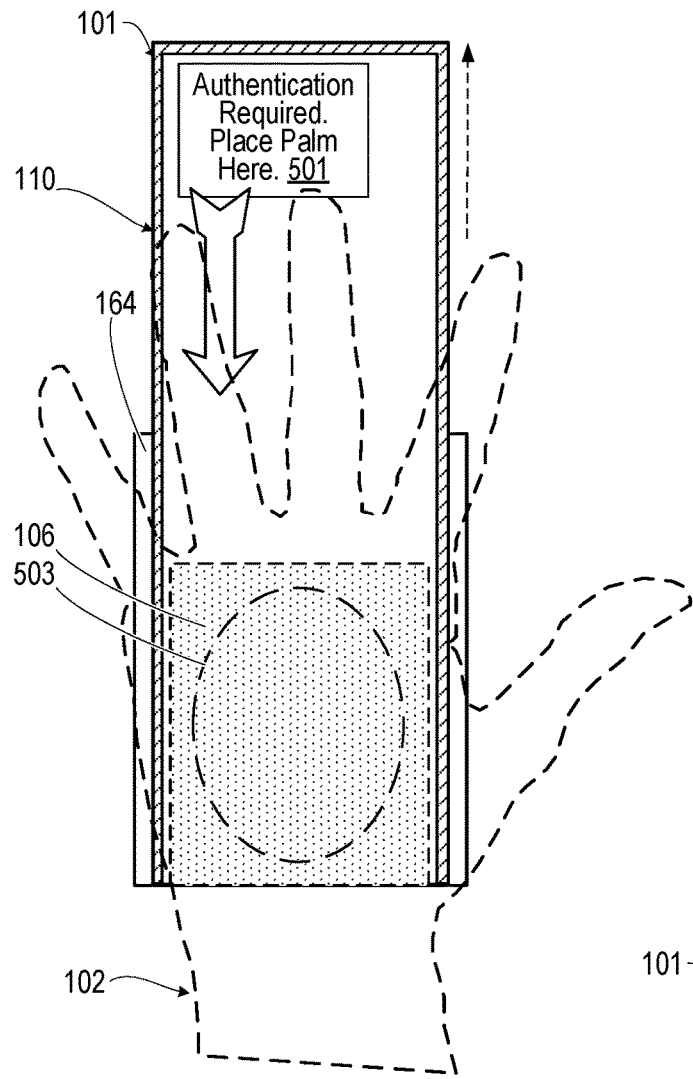
FIG. 5A depicts a front view of the example communication device having the blade assembly in a fully extended position with a user being prompted to position a palm against a front side for authentication, according to one or more embodiments.
Figure 5B:
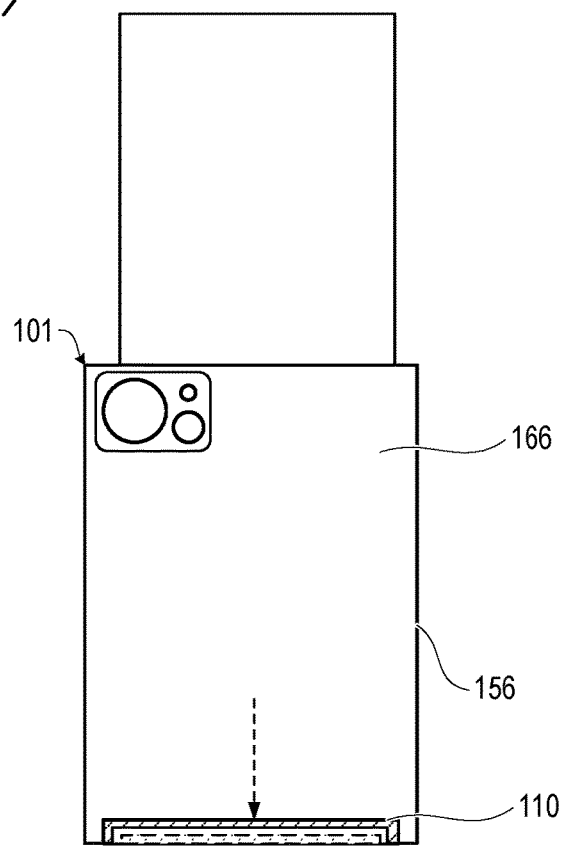
FIG. 5B depicts a back view of the example communication device of FIG. 5A with the blade assembly in the fully extended position, according to one or more embodiments.
Figure 5C:
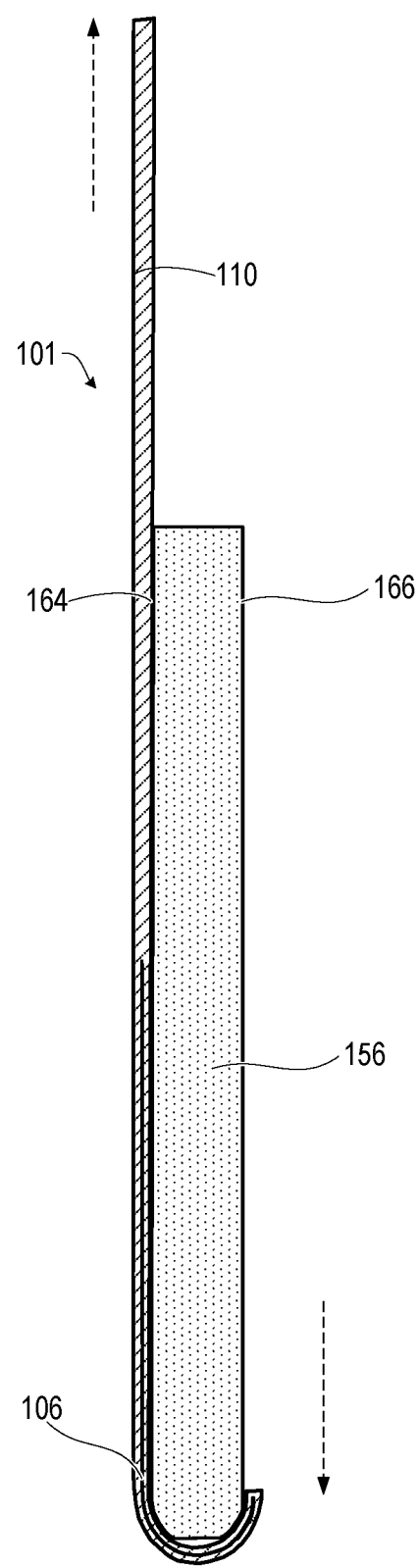
FIG. 5C depicts a left side view of the example communication device of FIG. 5A with the blade assembly in the fully extended position, according to one or more embodiments.

FIG. 5A depicts a front view of communication device 101 having blade assembly 110 in a fully extended position. FIG. 5B depicts a back view of communication device 101 having blade assembly 110 in the fully extended position. FIG. 5C depicts a left side view of communication device 101 having blade assembly 110 in the fully extended position. With reference to FIGS. 5A-5C, palmprint scanner 106 is substantially rotated onto front side 164 of device housing 156, preventing automatic capturing of palmprint 104 (FIG. 5A) from back side 166. In one or more embodiments, blade assembly 110 may be retracted when a condition for authentication from back side 166 (FIG. 5B) is required and then automatically extended after authentication is completed. With particular reference to FIG. 5A, in one or more embodiments, communication device 101 may prompt user 102 with notification 501 on flexible display 108 to present a palmprint or fingerprint to designated area 503 to authenticate user 102. FIG. 5D depicts a front view of communication device 101 with blade assembly 110 in the fully extended position presenting notification or prompt 502 to receive a fingerprint. FIG. 5E depicts a front view of communication device 101 with blade assembly 110 in the fully extended position and supporting an automatic capture of a palmprint when picked up from the front.

According to aspects of the present disclosure, controller 130 (FIGS. 1-2) triggers palmprint scanner 106 to scan for an image of a palm holding communication device 101 during a condition in which authentication of user 102 (FIG. 1) is required. In response to detecting a palmprint in the image, controller 130 (FIGS. 1-2) authenticates the user in response to identifying, from the image, a palmprint corresponding to an authorized user. In response to not detecting a palmprint in the image, controller 130 (FIGS. 1-2) presents a prompt via the flexible display to place one of a palm or a finger against the palmprint scanner.

In one or more embodiments, controller 130 (FIGS. 1-2) determines that authentication of the user is required based on detecting, by at least one motion sensor 172 (FIGS. 1-2), that communication device 101 changes from a stationary state to a moving state. In one example, prior to the condition in which authentication of the user is required, controller 130 (FIGS. 1-2) activates the translation mechanism to position blade assembly 110 in an extended position to increase display area of flexible display 108 on a front side of display housing 156. In response to the condition in which authentication of the user is required, controller 130 (FIGS. 1-2) initiates monitoring for the image via the palmprint scanner, which is translated to the front side of device housing 156. Controller 130 automatically authenticates the user via capturing an image of a palm of a hand picking up communication device 101 from front side 164 of device housing 156.

In one or more embodiments, prior to the condition in which authentication of the user is required, controller 130 (FIGS. 1-2) activates the translation mechanism to position the blade assembly in an at least partially retracted position that translates at least a portion of the palmprint scanner to a back side of the device housing. In response to the condition in which authentication of the user is required, controller 130 (FIGS. 1-2) initiates monitoring for the image via the palmprint scanner to automatically authenticate a palm of a hand holding the electronic device from a back side of the device housing. Assuming there is an area of the palmprint scanner large enough on front and back sides of the communication device 101, the palmprint scanner can capture the image of the palm from either the front or the back portion of the palmprint scanner depending on how the user picks up the device.

In one or more embodiments, prior to the condition in which authentication of the user is required, controller 130 (FIGS. 1-2) activates the translation mechanism to position the blade assembly in an at least partially retracted position that translates at least a portion of the palmprint scanner to a back side of the device housing. In response to not detecting a palmprint in the image, controller 130 (FIGS. 1-2) presents a prompt via the flexible display requesting the user place or reposition a palm against the palmprint scanner on the back side of the device housing. In an example, the prompt can indicate that the user should shift the grip downward on the back side of the device housing.

In one or more embodiments, in response to determining that a palmprint is not detected in the image, controller 130 (FIGS. 1-2) activates translation mechanism 150 to reposition blade assembly 110 (FIGS. 1-2). The repositioning may compensate for different grip positions. Controller 130 (FIGS. 1-2) then triggers palmprint scanner 106 to scan for an image of the palm 303 holding the communication device 101.

In one or more embodiments, in response to determining that a palmprint is not detected in the image, controller 130 (FIGS. 1-2) presents notification 125 (FIG. 1) via at least one output device 122 indicating a failure to detect a palmprint. The notification 125 (FIG. 1) is configured to prompt repositioning of the palm 303 of the user 102 (FIG. 3A). Examples are described above with regard to FIG. 3A. Controller 130 (FIGS. 1-2) then triggers palmprint scanner 106 to scan for an image of the palm 303 holding the communication device 101. In one or more embodiments, Controller 130 (FIGS. 1-2) may first attempt to reposition the palmprint scanner 106 to obtain a palmprint before attempting to nudge the user via a notification to reposition the grip on the communication device 101.

In one or more embodiments, prior to the condition in which authentication of the user is required, controller 130 (FIGS. 1-2) activates the translation mechanism to position the blade assembly in the extended position that translates the palmprint scanner to a front side of the device housing. In response to not detecting a palmprint in the image, controller 130 (FIGS. 1-2) presents a prompt via the flexible display requesting the user to place a finger against the palmprint scanner on the front side of the device housing to trigger fingerprint authentication. In one or more particular embodiments, in response to not detecting a fingerprint in the image from the palmprint scanner on the front side of the device housing, controller 130 (FIGS. 1-2) activates the translation mechanism to position the blade assembly in an at least partially retracted position that translates at least a portion of the palmprint scanner to a back side of the device housing. Controller 130 (FIGS. 1-2) initiates monitoring for a palmprint in the image via the palmprint scanner.

Figure 6:
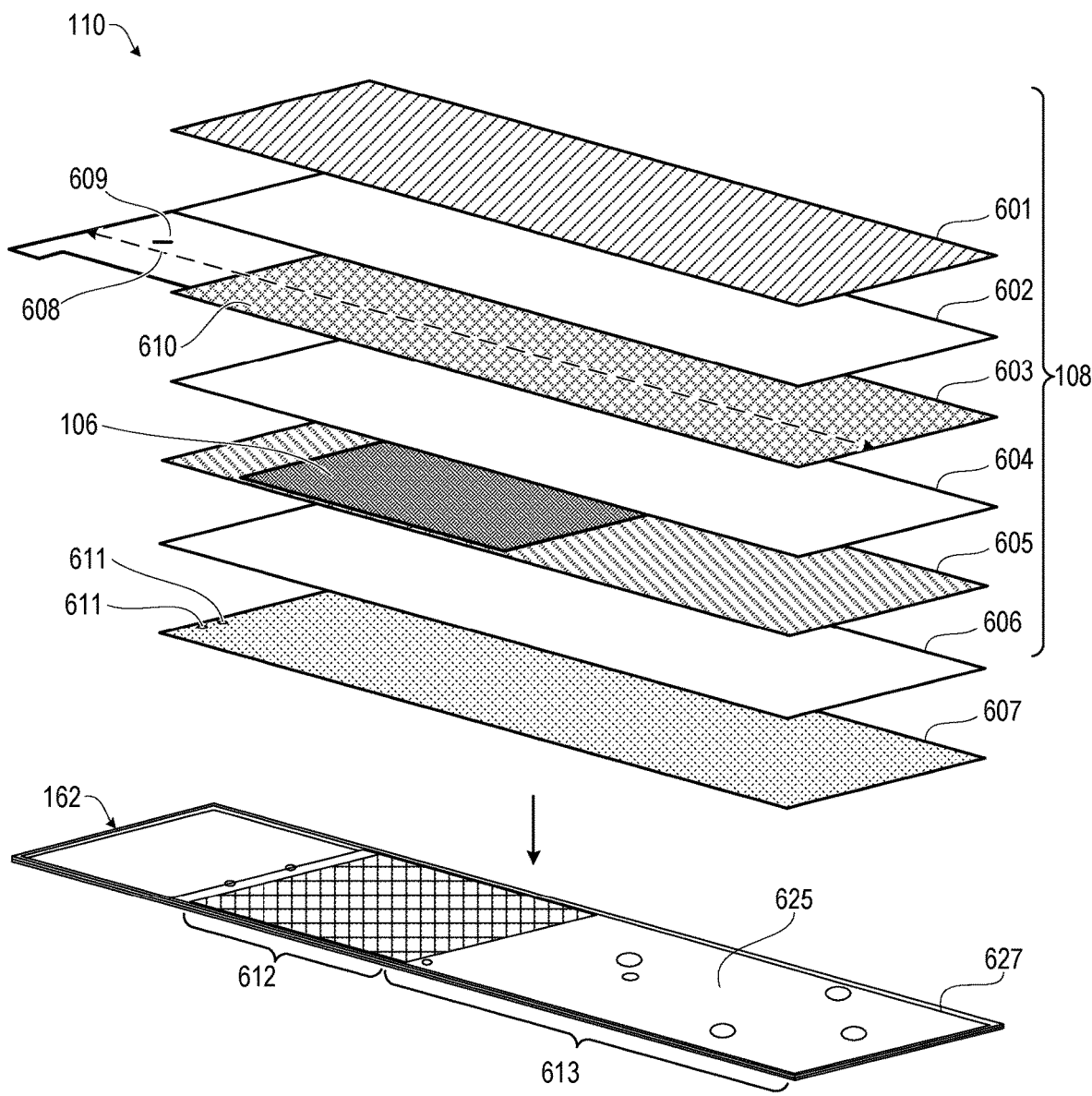
FIG. 6 depicts a blade assembly with a blade and with a flexible display and palmprint scanner in an exploded view, according to one or more embodiments.

FIG. 6 illustrates blade assembly 110 with blade 162 and with flexible display 108 in an exploded view. In one or more embodiments, flexible display 108 includes one or more layers that are coupled or laminated together to complete flexible display 108. In an example, flexible display 108 includes flexible protective cover 601, first adhesive layer 602, flexible display layer 603, second adhesive layer 604, scanner substrate 605 that supports palmprint scanner 106, third adhesive layer 606, and flexible substrate 607. Beginning from the top of the layer stack opposite to blade 162, in one or more embodiments, flexible protective cover 601 includes an optically transparent substrate such as a thin film sheet of a thermoplastic material. In an example, flexible protective cover 601 is manufactured from a layer of optically transparent polyamide or polycarbonate having a thickness of about eighty microns. Flexible protective cover 601 may function as a fascia by defining a cover for flexible display layer 603. In one or more embodiments, flexible protective cover 601 is optically transparent, in that light can pass through the flexible protective cover 601 so that objects behind flexible protective cover 601 can be distinctly seen. Flexible protective cover 601 may optionally include an ultra-violet barrier. Such a barrier can be useful in improving the visibility of flexible display layer 603.

Beneath flexible protective cover 601 is first adhesive layer 602. In one or more embodiments, first adhesive layer 602 is an optically transparent adhesive. The optically transparent adhesive can be applied to two sides of a thin, optically transparent substrate such that the first adhesive layer 602 functions as an optically transparent layer having optically transparent adhesive on both sides. Where so configured as "double-sided tape", first adhesive layer 602 may have a thickness of about fifty microns that can then be spooled and applied between, to couple together, flexible protective cover 601 and flexible display layer 603. In other embodiments, first adhesive layer 602 may be applied between flexible protective cover 601 and the display layer 603 as an optically transparent liquid or gel that is allowed to cure or optionally cured by heat, ultraviolet light, or other techniques. First adhesive layer 602 mechanically couples flexible display layer 603 to flexible protective cover 601.

In one or more embodiments, flexible display layer 603 is situated between scanner substrate 605 and flexible protective cover 601. Flexible display layer 603 includes image producing portion 609 having a same length and width, and aligned with, flexible protective cover 601 and flexible substrate 607. In one or more embodiments, flexible display layer 603 includes T-shaped tongue 610 attached along major axis 608 of flexible display layer 603. Blade 162 is sized to receive flexible display layer 603 attached to T-shaped tongue 610. In one or more embodiments, electronic circuit components configured to operate image producing portion 609 of the flexible display layer 603, connectors, and other components can be coupled to this T-shaped tongue 610 and further coupled to image producing portion 609 of flexible display 108. For instance, as shown in FIG. 6, flexible display layer 603 includes a T-shaped tongue 610 that extends beyond image producing portion 609 of flexible display layer 603 and other layers (601, 602, 604, 605, 606, and 607) of flexible display 108. While T-shaped tongue 610 is T-shaped in this illustrative embodiment, T-shaped tongue 610 can take other shapes.

Flexible display layer 603 optionally may be touch-sensitive. In one or more embodiments, flexible display layer 603 is an organic light emitting diode (OLED) display layer. When coupled to scanner substrate 605 and flexible substrate 607, flexible display layer 603 can bend in accordance with various bending radii. For example, some embodiments allow bending radii of between thirty and six hundred millimeters. Other substrates allow bending radii of around five millimeters to provide a display that is foldable through active bending. Other configurations of flexible display 108 may accommodate both bends and folds. In one or more embodiments, flexible display layer 603 may be formed from multiple layers of flexible material such as flexible sheets of polymer or other materials. Flexible display layer 603 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 603 has a thickness of about 130 microns.

In one or more embodiments, to be touch sensitive, flexible display layer 603 includes a layer including one or more optically transparent electrodes. In one or more embodiments, flexible display layer 603 includes an organic light emitting diode layer configured to present images and other information to user 102 (FIG. 1). The organic light emitting diode layer can include one or more pixel structures arranged in an array, with each pixel structure including a plurality of electroluminescent elements, such as organic light emitting diodes. These various layers can be coupled to one or more optically transparent substrates of flexible display layer 603. In one or more embodiments, flexible substrate 607 includes a thin layer of steel having a thickness of about thirty microns. In one or more embodiments, flexible substrate 607 includes a thin layer of thermoplastic material.

In one or more embodiments, flexible display layer 603 is coupled to scanner substrate 605 by second adhesive layer 604. In one or more embodiments, second adhesive layer 604 is identical to the first adhesive layer 602 and includes an optically transparent adhesive. Palmprint scanner 106 may be implemented as a pattern sensor designed with thin film transistor (TFT) technology. Palmprint scanner 106 may include an acquisition element, such as a photoelectric acquisition element, a pyroelectric acquisition element, or a capacitance acquisition element, and one or more TFTs that can control this acquisition element, respectively. Alternatively, the pattern sensor may have a plurality of basic acquisition cells (or pixels) on a supporting substrate. In an example, TFT technology may provide a transistor formed by continuously forming a conductive and insulating semiconductor layer over a supporting substrate. TFTs may be formed by depositing layers of semiconductor materials such as hydrogenated amorphous silicon, polysilicon (e.g., polycrystalline silicon after annealing) or indium gallium zinc oxide (IGZO) type material. Thus, a semiconductor channel formation region of a transistor may be formed, and a conductive layer used for forming a gate electrode, a source electrode, or a drain electrode of the transistor may be formed before such film formation. Pattern sensors formed in TFT technology are compared by using a support substrate formed from a low-cost material such as glass instead of the single crystal silicon substrate commonly used to form transistors. TFT technology may provide a pattern sensor whose sensor surface is substantially the same as the surface of the resulting pattern (e.g., fingerprint or palmprint). The pattern requires no optical focusing system (or lens) to be placed between the pattern sensor and the object for which image acquisition is desired.

In one or more embodiments, scanner substrate 605 is coupled to flexible substrate 607 by third adhesive layer 606. In one or more embodiments, third adhesive layer 606 is identical to the first adhesive layer 602 and includes an optically transparent adhesive. However, since third adhesive layer 606 is coupled between flexible display layer 603 and the flexible substrate 607. i.e., under the flexible display layer 603, an optically transparent adhesive is not a requirement. Third adhesive layer 606 may be partially optically transparent or not optically transparent. Regardless of whether third adhesive layer 606 is optically transparent, in one or more embodiments, adhesive of the third adhesive layer 606 is applied to two sides of a thin, flexible substrate.

Where so configured, in one or more embodiments, third adhesive layer 606 has a thickness of about fifty microns. This extremely thin version of "double-sided tape" can then be spooled and applied between, to couple together flexible display layer 603 and flexible substrate 607. In other embodiments, as with first adhesive layer 602, third adhesive layer 606 may instead be applied between flexible display layer 603 and flexible substrate as a liquid or gel that is passively cured or that is actively cured by heat, ultraviolet light, or other techniques.

In other embodiments, a layer (601-602) above flexible display layer 603 may be configured with enough stiffness to make the flexible substrate 607 unnecessary. In an example, flexible protective cover 601 is configured with enough stiffness to provide sufficient protection for flexible display 108 during bending, enabling flexible substrate 607 to be omitted.

Flexible display 108 is supported by flexible substrate 607 and by blade 162 having blade substrate 625. In one or more embodiments, blade substrate 625 includes a layer of steel. In one or more embodiments, blade substrate 625 is thicker than flexible substrate 607. In an example, flexible substrate 607 includes a steel layer with a thickness of about thirty microns and blade substrate 625 includes a layer of steel having a thickness of about one hundred microns. In one or more embodiments, blade substrate 625 is a rigid, substantially planar support layer. In an example, blade substrate 625 may be manufactured from stainless steel, from a thin, rigid thermoplastic sheet, or from nitinol material, which is a nickel-titanium alloy.

In one or more embodiments, the flexible substrate 607 is slightly longer along a major axis of the flexible substrate 607 than is the image producing portion 609 of the flexible display 108. Since the T-shaped tongue 610 is T-shaped, this allows one or more apertures 611 to be exposed on either side of the base of the T of the T-shaped tongue 610. As will be described in more detail below, this extra length along the major axis provided by the flexible substrate 607 allows one or more fasteners to rigidly couple the first end of the flexible substrate 607 to a tensioner.

Embodiments of the disclosure contemplate that some of the layers comprising the flexible display 108 are stiffer than others. Similarly, other layers of the flexible display 108 are softer than others. For example, where the flexible substrate 607 is manufactured from a metal, one example of which is stainless steel, this layer is stiffer than either the first adhesive layer 602 or the third adhesive layer 606. In one or more embodiments, the stainless steel is stiffer than the flexible display layer 603 as well. In one or more embodiments, the flexible substrate 607 is the stiffest layer in the flexible display 108, while the first adhesive layer and the third adhesive layer 606 are the softest layers of the flexible display 108. The flexible protective cover 601 and the flexible display layer 603 have a stiffness that falls between that of the flexible substrate 607 and the adhesive layers in one or more embodiments.

In one or more embodiments, the various layers of the flexible display 108 are laminated together in a substantially planar configuration. Said differently, in one or more embodiments the flexible substrate 607 is configured as a substantially planar substrate. The third adhesive layer 606 can be attached to this substantially planar substrate, with the flexible display layer 603 then attached to the third adhesive layer 606. The first adhesive layer 602 can be attached to the flexible display layer 603, with the flexible protective cover 601 attached to the first adhesive layer 602. To ensure proper coupling, flexible display layer 603 can be cured, such as in an autoclave at a predefined temperature for a predefined duration. Where employed, such curing allows any air bubbles or other imperfections in the various layers to be corrected. In one or more embodiments, flexible substrate 607 is configured as a substantially planar substrate resulting in flexible display 108 being substantially planar.

In one or more embodiments, blade substrate 625 of blade 162 includes both flexible portion 612 and rigid portion 613. Flexible portion 612 is positioned to encounter bending in translation of blade assembly 110 from the retracted position to the extended position. Rigid portion 613 is positioned to remain on front side 164 of device housing 156 (FIG. 1) during translation. In the extended position, rigid portion 613 extends beyond front side 164 of device housing 156 (FIG. 1). In an example, blade substrate 625 is manufactured from a metal such as steel having a thickness of one hundred microns that provides rigidity to rigid portion 613.

In one or more embodiments, blade 162 includes silicone border 627 positioned around a perimeter of blade substrate 625 to protect the edges of flexible display 108 when attached to blade substrate 625 of blade 162. In one or more embodiments, silicone border 627 is co-molded around the perimeter of blade substrate 625.

In one or more embodiments, rigid portion 613 of blade substrate 625 can define one or more apertures. These apertures can be used for a variety of purposes. In an example, some of the apertures can be used to rigidly fasten blade 162 to translation mechanism 150 (FIG. 1), such as a display roller mechanism. Additionally, some of the apertures can contain magnets. Hall-effect sensors positioned in device housing 156 (FIG. 1) to which blade assembly 110 is coupled can then detect the positions of these magnets such that controller 130 (FIG. 1) can determine whether blade assembly 110 including flexible display 108 are in the extended position, the retracted position, the peck position, or an intermediate position.

In one or more embodiments, flexible display 108 is coupled to blade substrate 625 of blade 162 within the confines of silicone border 627. In an example, a first end of flexible display 108 is adhesively coupled to rigid portion 613 of blade substrate 625 of blade 162. The other end of flexible display 108 may be rigidly coupled to a tensioner by passing fasteners through apertures 611 of flexible substrate 607.

Figure 7:
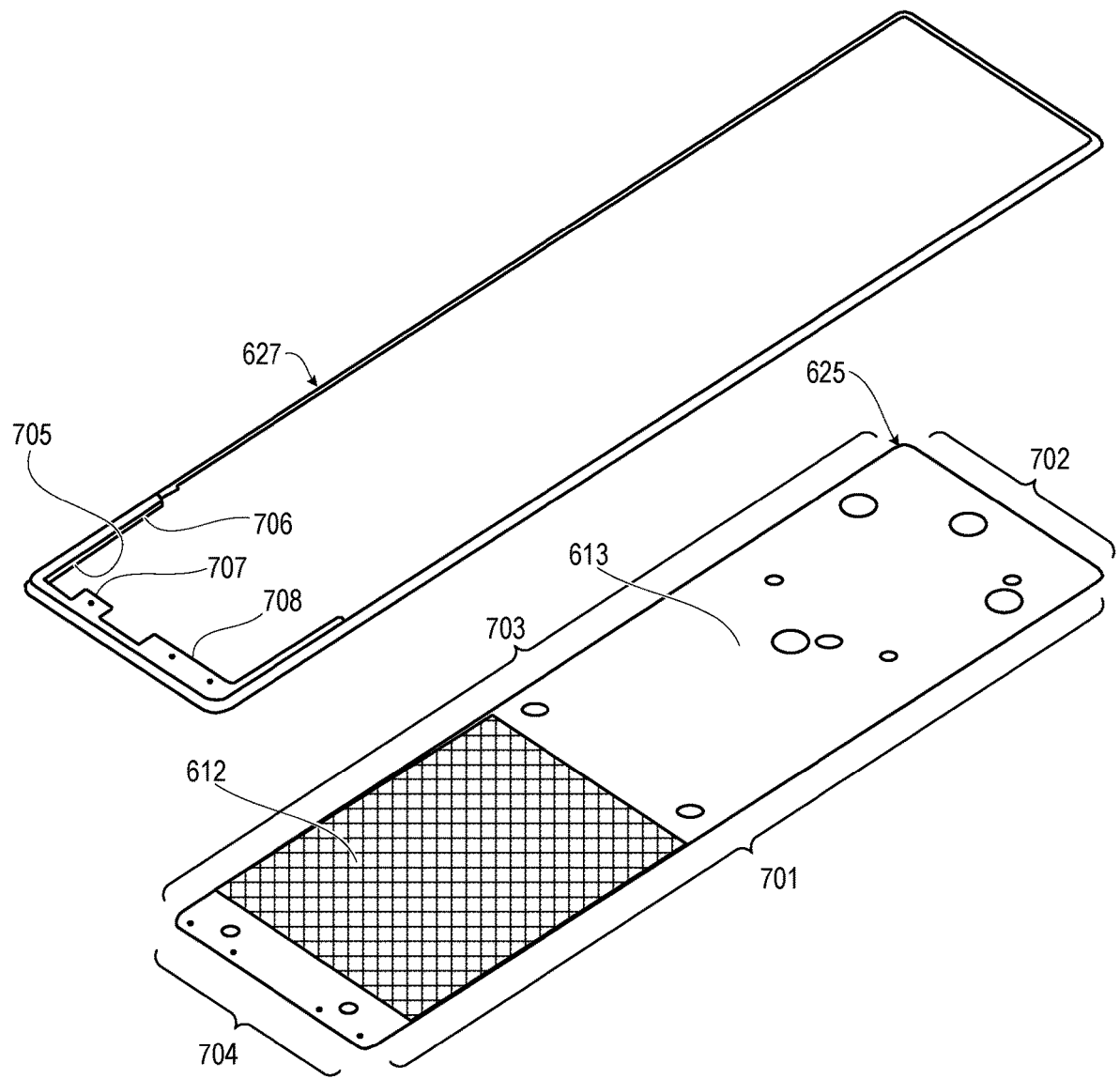
FIG. 7 depicts a blade substrate and a silicone border in an exploded view, according to one or more embodiments.

FIG. 7 depicts blade substrate 625 and silicone border 627 shown in an exploded view. Silicone border 627 defines a singular, contiguous, unitary piece of silicone. In the illustrative embodiment of FIG. 7, silicone border 627 surrounds three sides 701, 702, and 703 of blade substrate 625, and extends beyond minor side 704 to define receiving recess 705 that can accommodate mechanical and electrical components such as electronic circuit components to provide power and control for flexible display 108 (FIG. 6) that will situate within the perimeter defined by silicone border 627. A tensioner may keep flexible display 108 (FIG. 6) flat across flexible portion 612 of blade substrate 625, flexible circuits, and other components. In one or more embodiments, portions 706, 707, 708 of silicone border 627 extending beyond minor side 704 of blade substrate 625 surrounding receiving recess 705 are thicker than are the other portions of silicone border 627 that will surround flexible display 108 (FIG. 6), enabling components to be placed within receiving recess 705.

Figure 8:
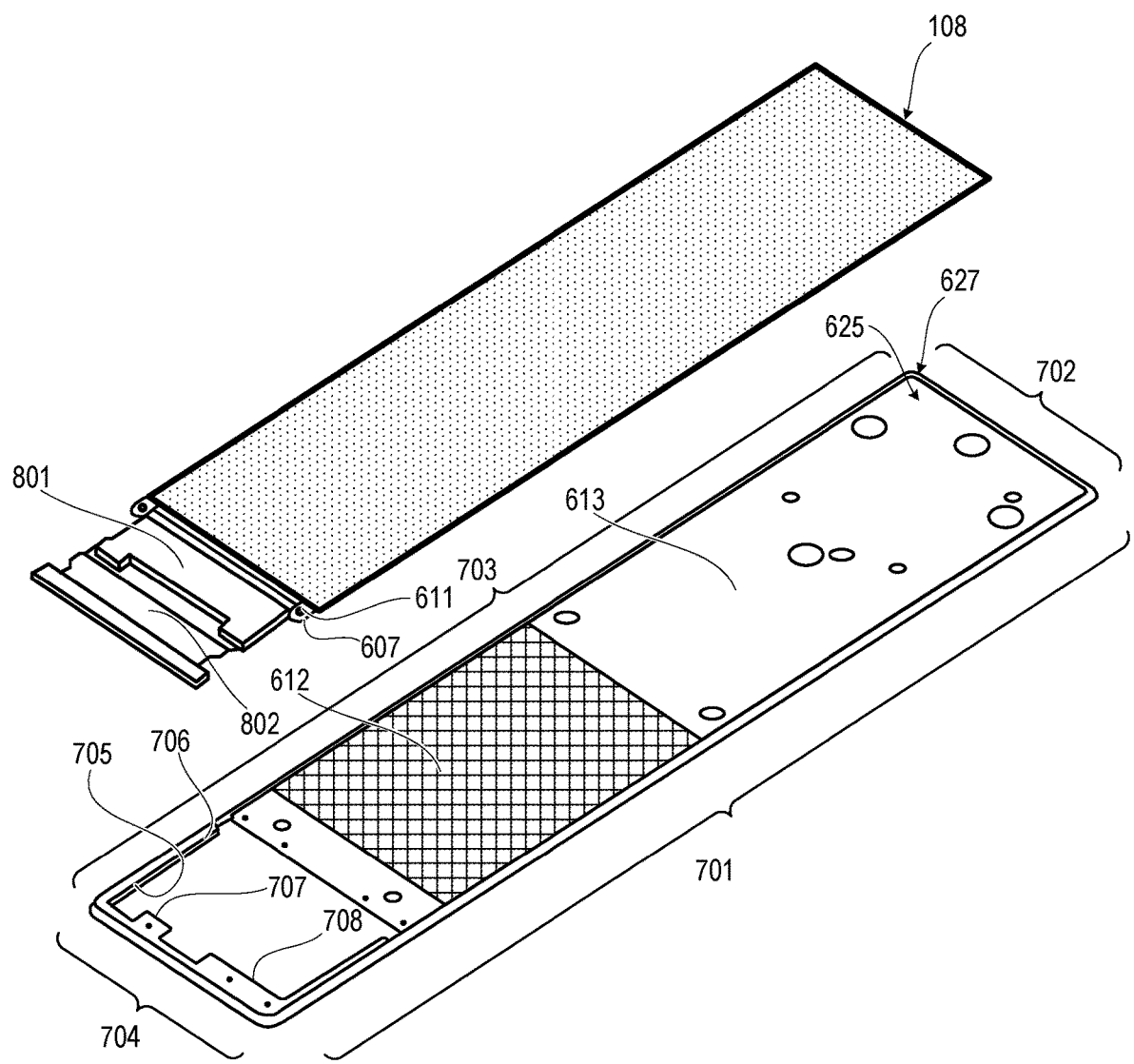
FIG. 8 depicts the flexible display and the blade with silicone border over-molded on the blade substrate, according to one or more embodiments.

FIG. 8 depicts flexible display 108 and blade 162 with silicone border 627 over-molded on blade substrate 625. Silicone border 627 surrounds three sides 701, 702, and 703 of blade substrate 625 and extends beyond minor side 704 to define receiving recess 705 that can accommodate mechanical and electrical components. Electronic circuits 801 that are operable to provide power and control for flexible display 108 have been coupled to T-shaped tongue 610 of flexible display layer 603 (FIG. 6). Additionally, mechanical connector 802 has been connected to the top of the T on T-shaped tongue 610. Flexible substrate 607 extends beyond a distal end of flexible display layer 603 (FIG. 6) so that apertures 611 defined therein can be coupled to a tensioner to ensure that flexible display 108 stays flat around flexible portion 612 of blade substrate 625 when flexible portion 612 of blade substrate 625 passes around a rotor positioned at the end of device housing 156 (FIG. 1).

In one or more embodiments, blade 162 can be fixedly coupled to flexible display 108. In an example, flexible display 108 is coupled to rigid portion 613 by an adhesive or other coupling mechanism. A tensioner can then be positioned in receiving recess 705. In one or more embodiments, the tensioner rigidly couples with fasteners to the apertures 611 (FIG. 6) of flexible substrate 607 (FIG. 6) to keep flexible display 108 flat across flexible portion 612, regardless of how flexible portion 612 is being bent around the minor surface of device housing 156 or a corresponding rotor.

Figure 9:
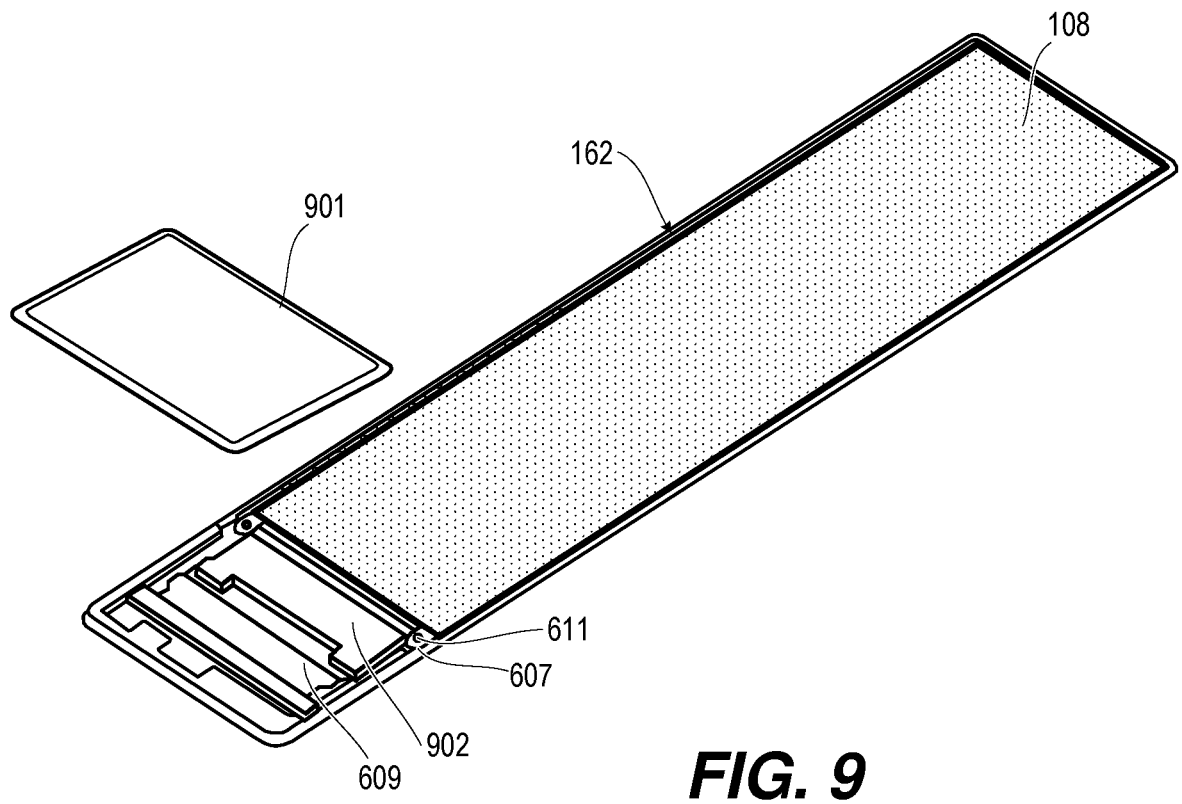
FIG. 9 depicts the flexible display after being coupled to the blade surrounded by a silicone border, according to one or more embodiments.
Figure 10:
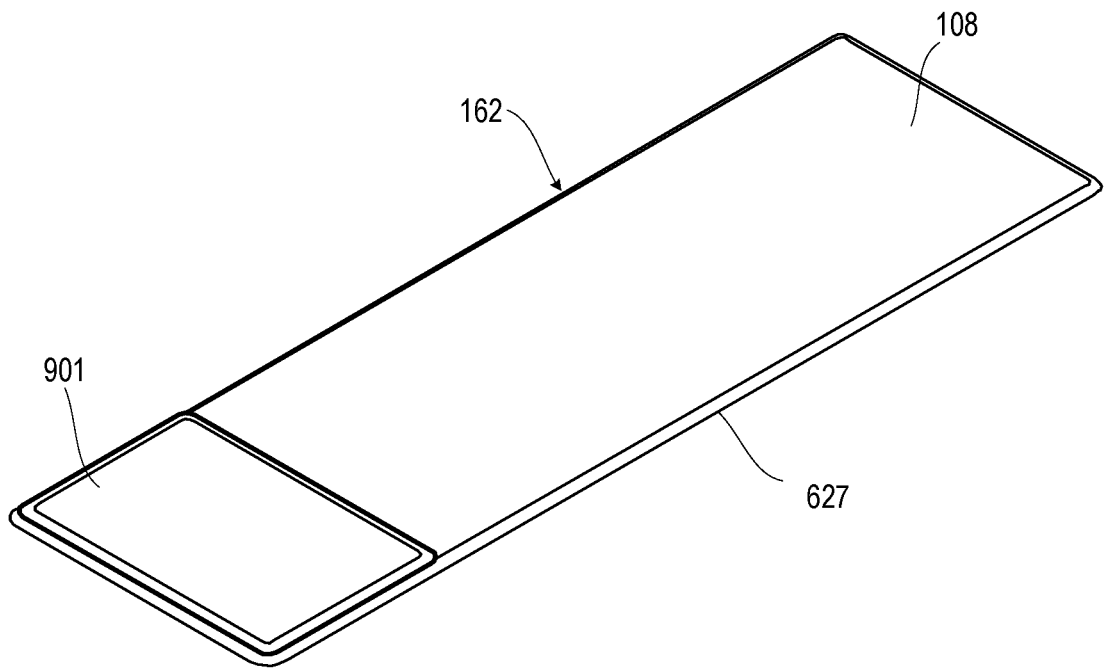
FIG. 10 depicts the blade assembly completely configured with a cover and in an unrolled state, according to one or more embodiments.

FIG. 9 depicts flexible display 108 after being coupled to blade 162. Silicone border 627 surrounds the flexible display 108, with silicone border 627 surrounding and abutting three sides of the flexible display layer (603). A flexible substrate is then connected to the electronic circuits 801 carried by the T-shaped tongue 610. Additionally, a tensioner can be coupled to the flexible substrate 607. Thereafter, cover 901 is attached to silicone border 627 atop the electronic circuits 902 and other components situated on or around the T-shaped tongue 610. This portion of blade assembly 110 where the components are stored beneath cover 901 may be referred to as the "backpack." FIG. 10 depicts blade assembly 110 completely configured with cover 901.

Figure 11:
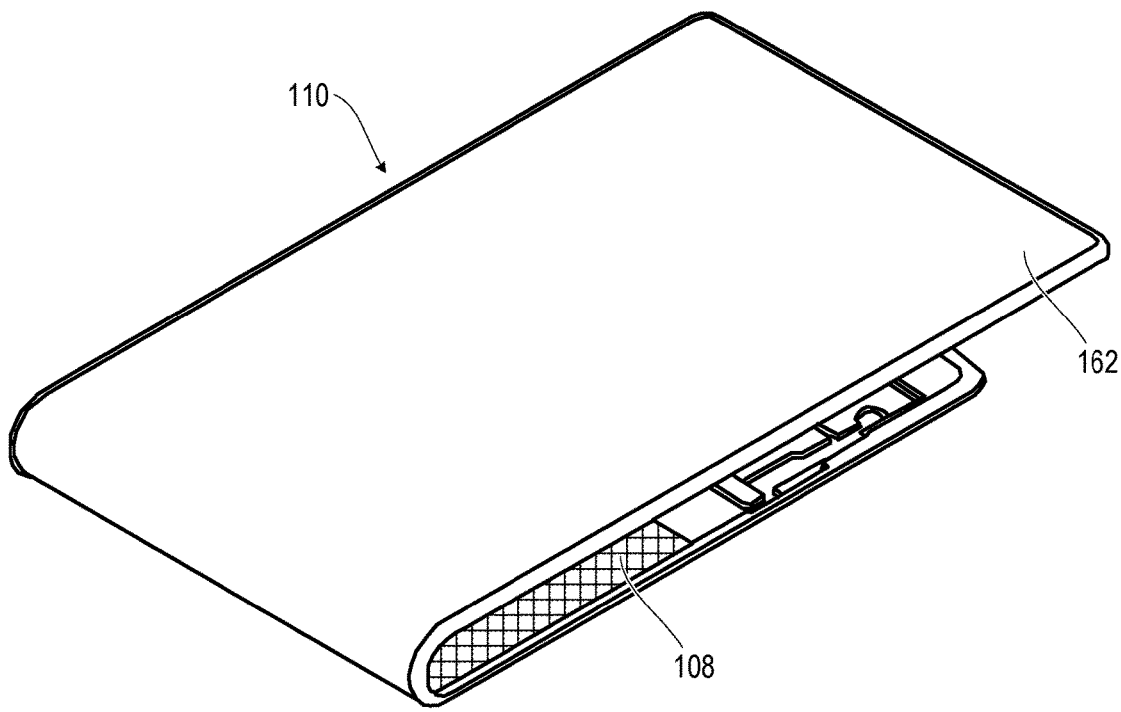
FIG. 11 depicts the blade assembly in a fully retracted state, according to one or more embodiments.
Figure 12:
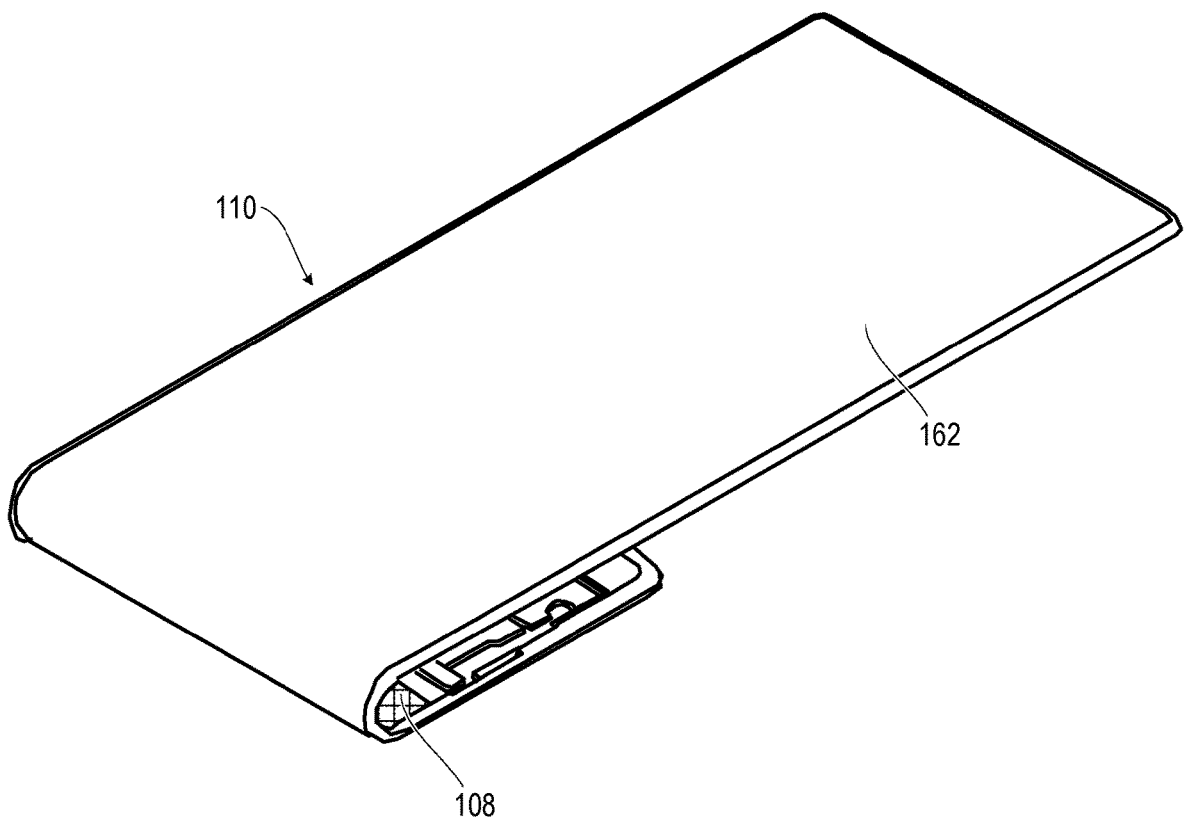
FIG. 12 depicts the blade assembly in a fully extended state, according to one or more embodiments.

FIG. 11 depicts blade assembly 110 in a fully retracted state. FIG. 12 depicts blade assembly 110 in a fully extended state. In one or more embodiments, flexible display 108 and blade 162 are configured to wrap around a minor surface of device housing 156 (FIG. 1) where a display roller mechanism is situated. In one or more embodiments, the display roller mechanism includes a rotor that is positioned within a curvilinear section of flexible display 108 and blade 162. When placed within device housing 156 (FIG. 1), translation of translation mechanism 150 (FIG. 1) causes translation of blade assembly 110, which in turn causes rotation of the rotor. The result is a linear translation of the flexible display 108 and blade 162 across a translation surface of device housing 156 (FIG. 1) by drawing flexible display 108 and the blade 162 around the rotor. As previously described, blade substrate 625 (FIG. 6) of blade assembly 110 includes flexible portion 612 (FIG. 6) that allows blade 162 and flexible display 108 to deform around device housing 156 (FIG. 1), corresponding to the respective points of rolling depicted in FIGS. 11-12.

Figure 13A:
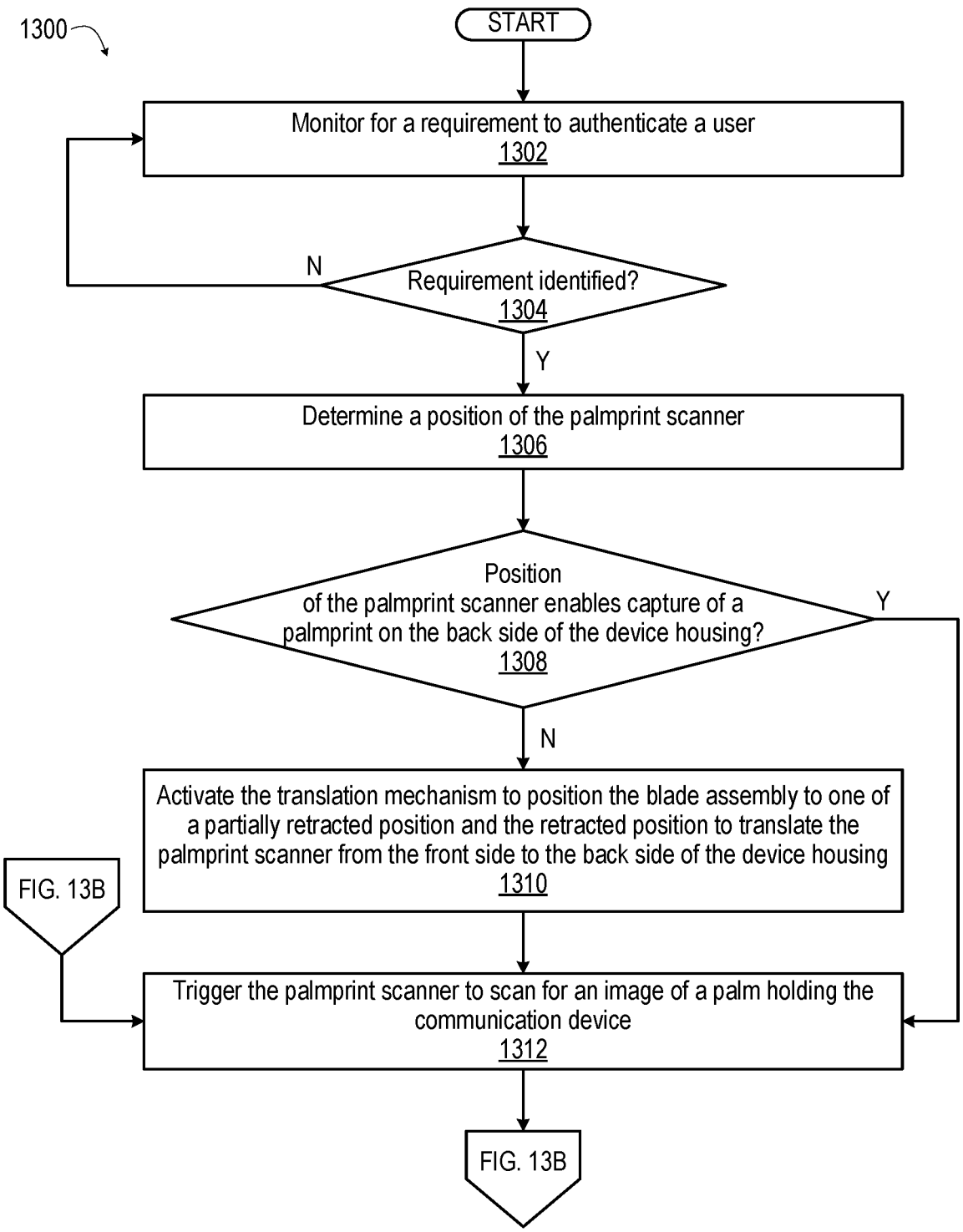
FIG. 13A-13B (collectively "FIG. 13") is a flow diagram presenting a method of expediting authentication of a user by capturing a palmprint, without necessarily requiring a dedicated user action, according to one or more embodiments.
Figure 13B:
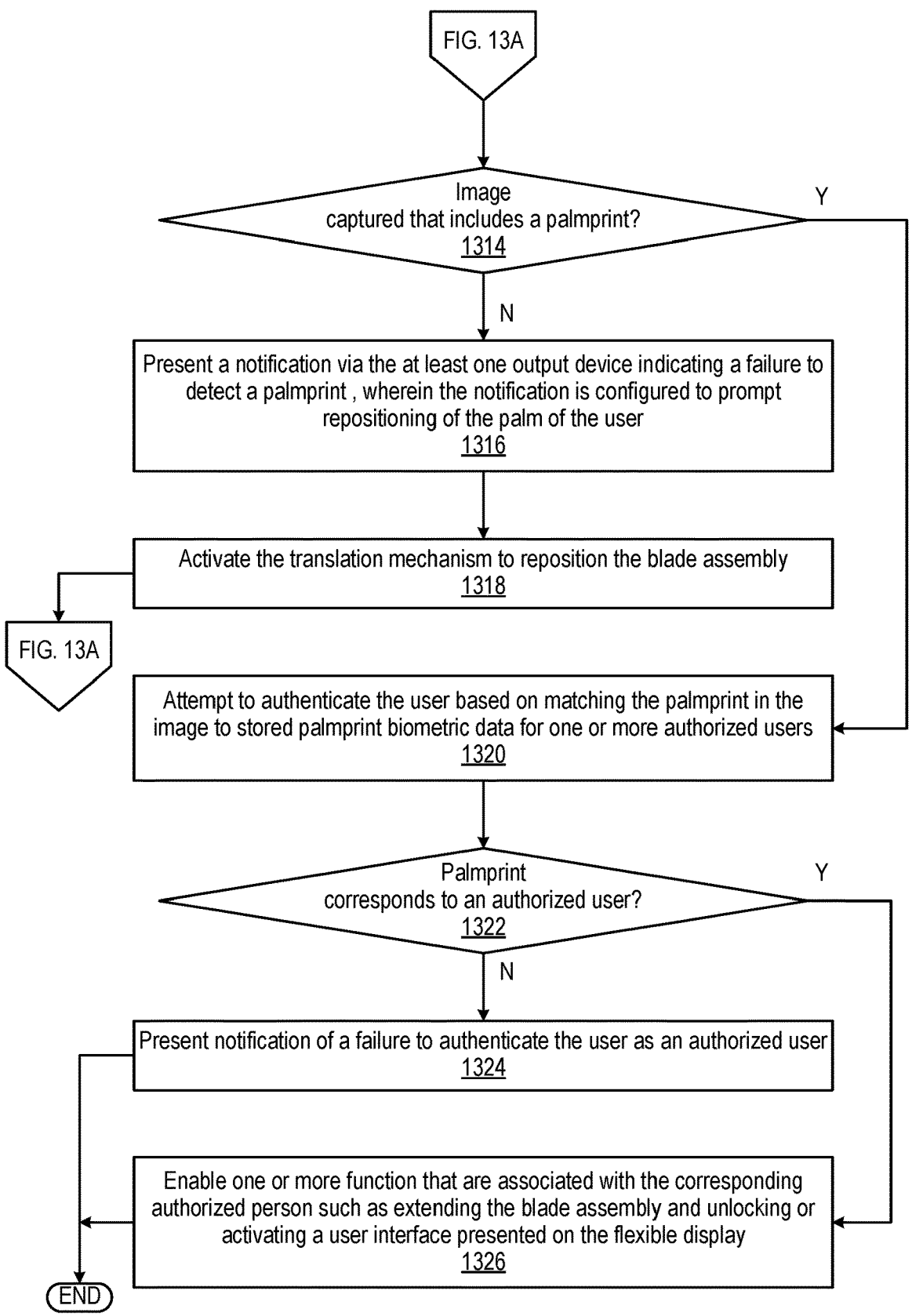
Figure 14:
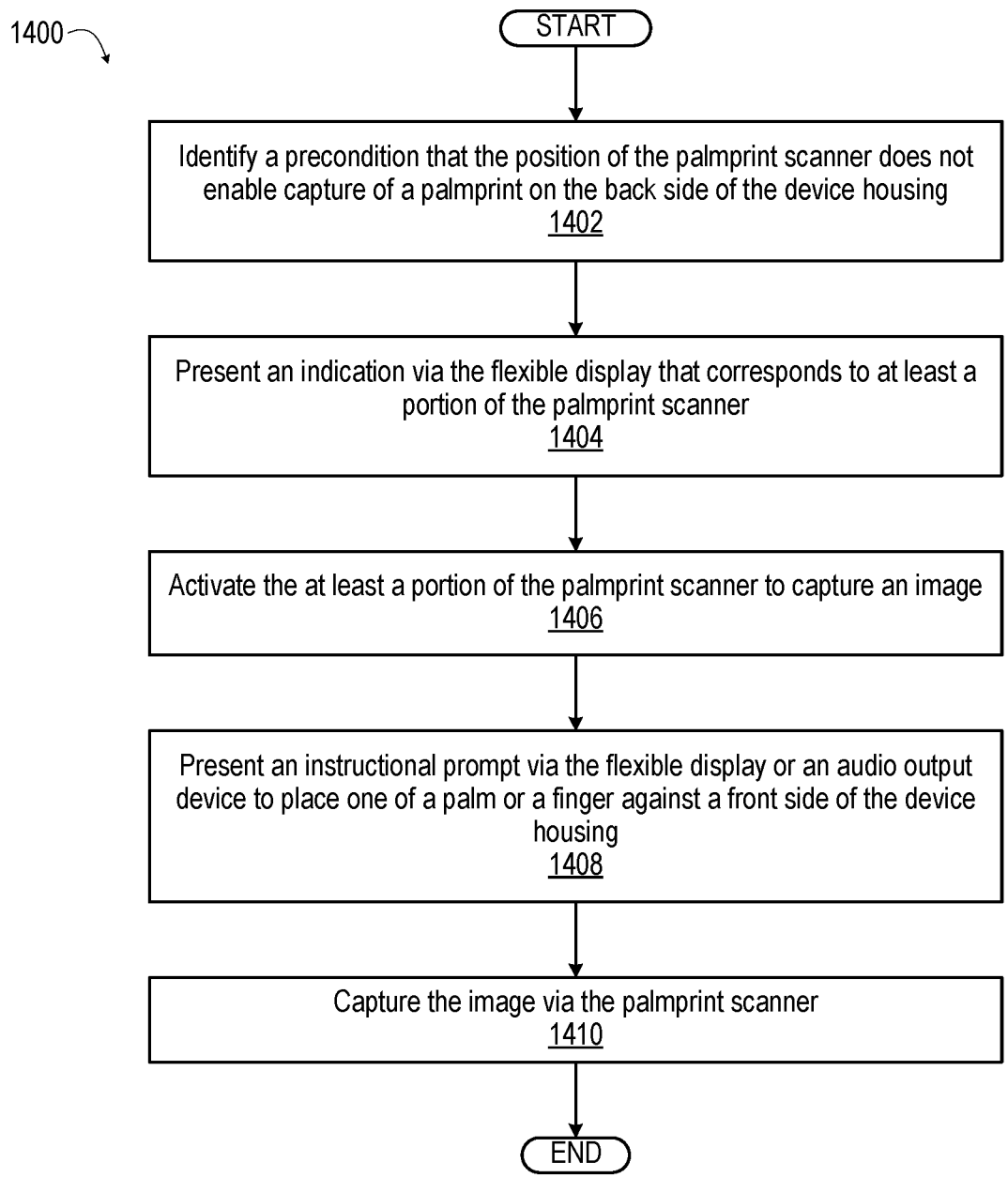
FIG. 14 is a flow diagram presenting a method for prompting authentication using a palmprint or fingerprint when a blade assembly of the communication device is fully extended, according to one or more embodiments.
Figure 15:
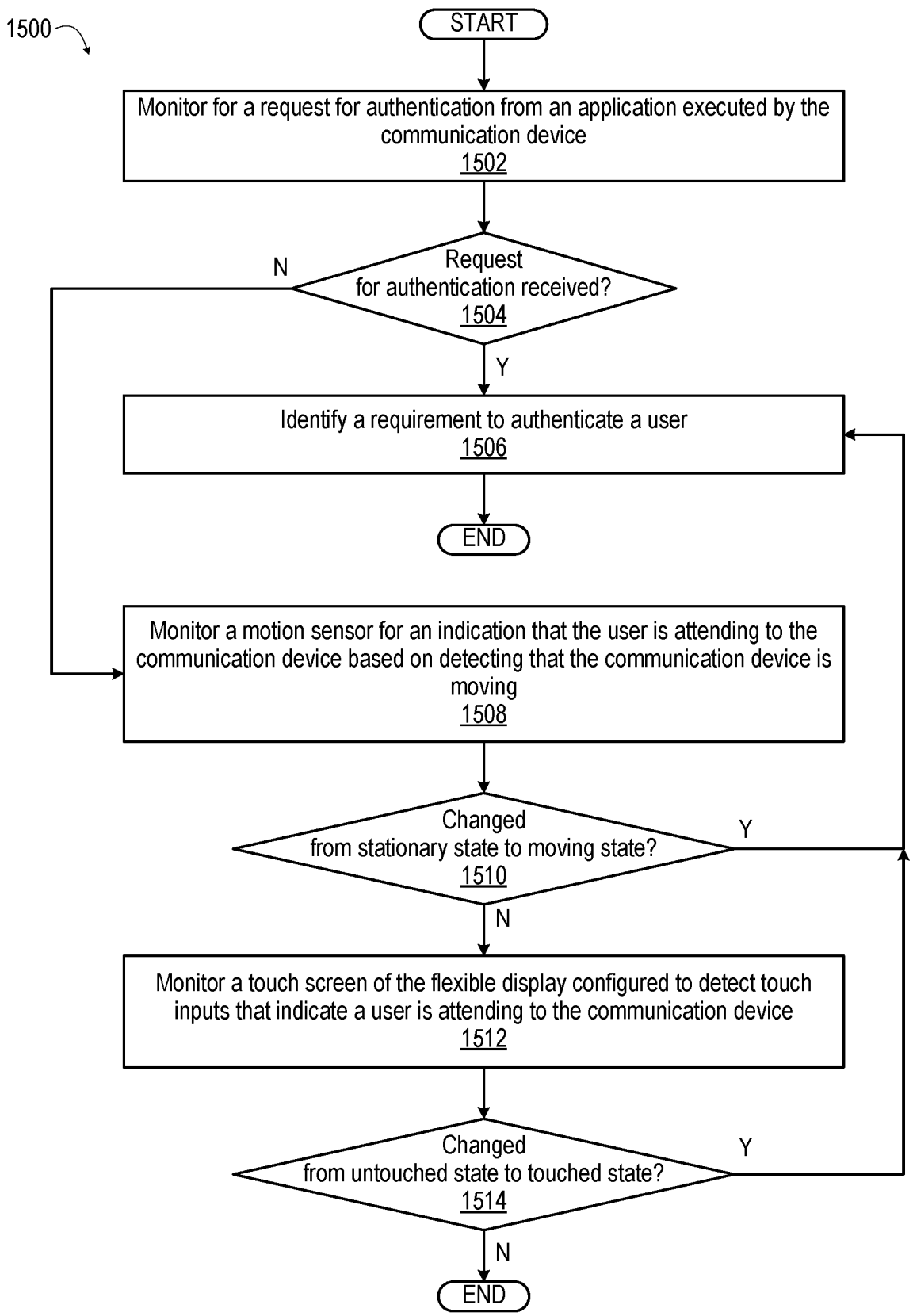
FIG. 15 is a flow diagram presenting a method for detecting a condition in which authentication of a user is required, according to one or more embodiments.
Figure 16A:
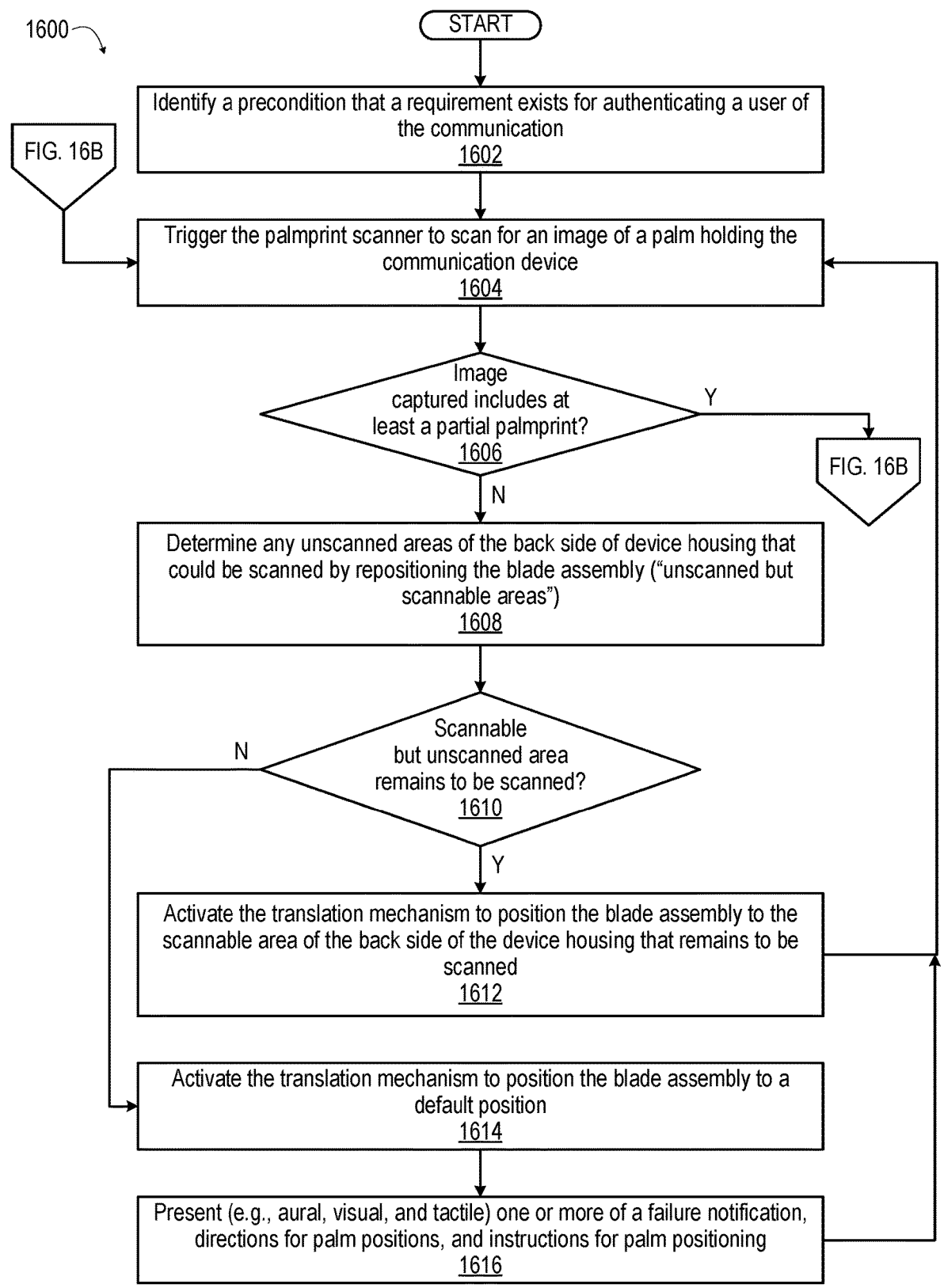
FIG. 16A-16B (collectively "FIG. 16") is a flow diagram presenting a method for detecting and mitigating variations in gripping position that prevent an accurate capture of a palmprint.
Figure 16B:
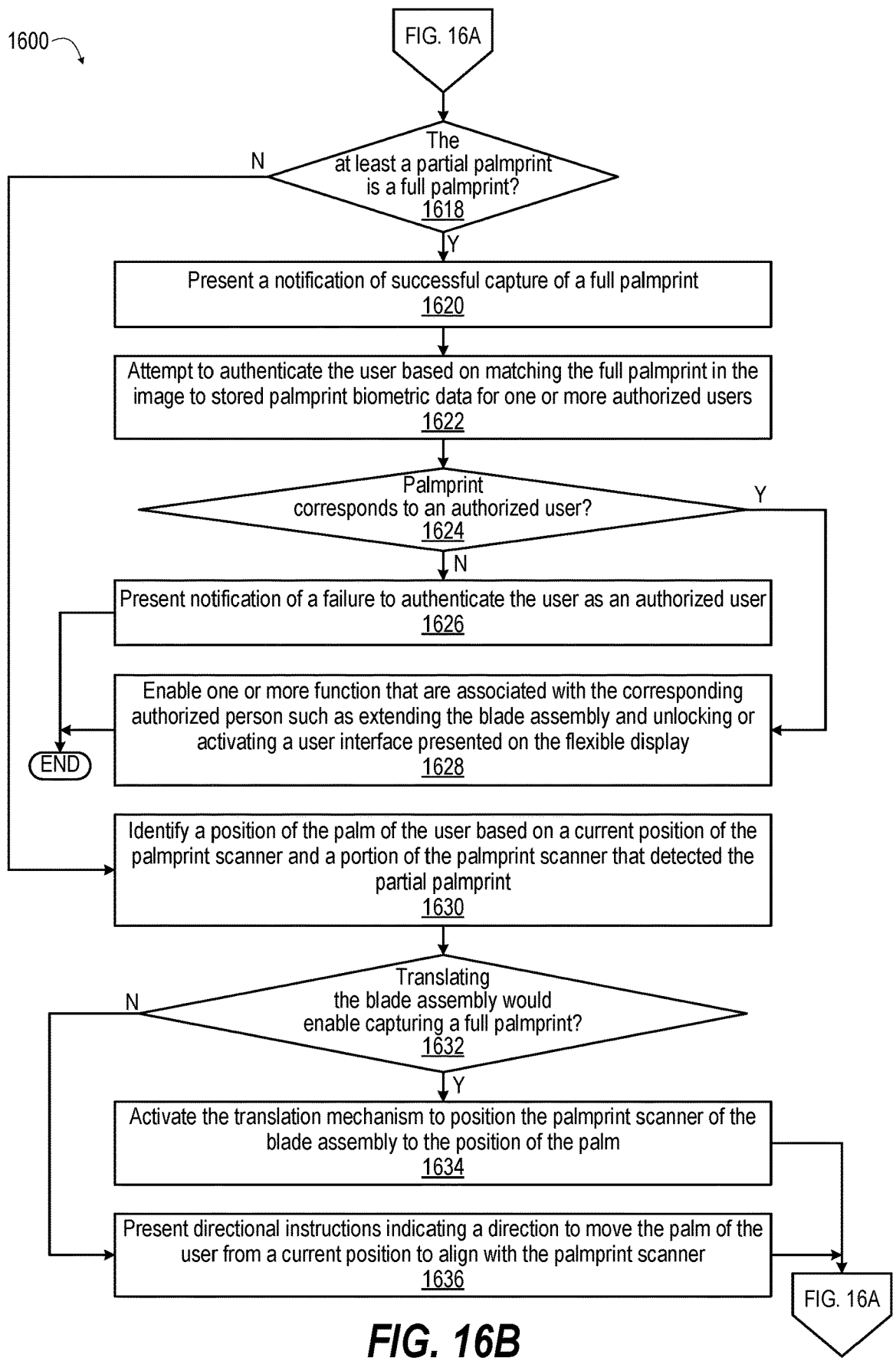

FIG. 13A-13B (collectively "FIG. 13") are a flow diagram presenting method 1300 of expediting authentication of a user by capturing a palmprint, without necessarily requiring a dedicated user action. FIG. 14 is a flow diagram presenting method 1400 of an alternate feature to augment or modify method 1300 (FIG. 13) for prompting authentication using a palmprint when a blade assembly of the communication device is fully extended. FIG. 15 is a flow diagram presenting method 1500 for detecting a condition in which authentication of a user is required. FIGS. 16A-16B (collectively "FIG. 16") are a flow diagram presenting method 1600 of an alternate feature to augment or modify method 1300 (FIG. 13) for detecting and mitigating variations in gripping position that prevent an accurate capture of a palmprint. The description of method 1300 (FIG. 13), method 1400 (FIG. 14), method 1500 (FIG. 15), and method 1600 (FIG. 16) are provided with general reference to the specific components illustrated within the preceding FIGS. 1, 2, 3A-3C, 4A-4C, 5A-5C, and 6-12. Specific components referenced in method 1300 (FIG. 13), method 1400 (FIG. 14), method 1500 (FIG. 15), and method 1600 (FIG. 16) may be identical or similar to components of the same name used in describing preceding FIGS. 1, 2, 3A-3C, 4A-4C, 5A-5C, and 6-12. In one or more embodiments, controller 130 (FIGS. 1-2) configures communication device 101 (FIGS. 1-2) to provide the described functionality of method 1300 (FIG. 13), method 1400 (FIG. 14), method 1500 (FIG. 15), and method 1600 (FIG. 16).

With reference to FIG. 13A, method 1300 includes monitoring for a requirement to authenticate a user (block 1302). Method 1300 includes determining whether a requirement to authenticate the user is identified (decision block 1304). In response to determining that no requirement to authenticate the user is identified, method 1300 returns to block 1302. In response to determining that the requirement to authenticate the user is identified, method 1300 includes determining a position of the palmprint scanner (block 1306). According to the described embodiments, the translation mechanism is operable to slide the blade assembly relative to the device housing between an extended position and a retracted position. The palmprint scanner is sized to cover at least a portion of a back side of the device housing for receiving the palmprint while the blade assembly is in at least one of a partially retracted position and the retracted position. The communication device has an upright orientation. The blade assembly includes a blade, the palmprint scanner, and a flexible display attached to the blade. Method 1300 includes determining whether the position of the palmprint scanner enables capture of a palmprint on the back side of the device housing (decision block 1308). In response to determining that the position of the palmprint scanner does not enable capture of a palmprint on the back side of the device housing, in one or more embodiments, method 1300 includes activating the translation mechanism to position the blade assembly to one of a partially retracted position and the retracted position to translate the palmprint scanner from the front side to the back side of the device housing (block 1310). In response to determining that the position of the palmprint scanner enables capture of a palmprint on the back side of the device housing in decision block 1308 or after block 1310, Method 1300 includes triggering the palmprint scanner to scan for an image of a palm holding the communication device (block 1312). Then method 1300 proceeds to block 1314 of FIG. 13B.

With reference to FIG. 13B, method 1300 includes determining whether an image is captured that includes a palmprint (decision block 1314). In response to determining that an image is not captured that includes a palmprint, in one or more embodiments, method 1300 includes presenting a notification via at least one output device indicating a failure to detect a palmprint, where the notification comprises directions or instructions configured to prompt repositioning of the palm of the user (block 1316). As described above with regard to FIG. 3A, examples of the notification may include at least one from a group including: (i) an audio alert or instruction; (ii) a display position jiggle; (iii) a visual direction cue and instructions; (iv) a vibratory alert; and (v)

a light alert. In one or more embodiments, method 1300 includes activating the translation mechanism to reposition the blade assembly (block 1318). The repositioning is directed to positioning the palmprint scanner under the palm of the user. Then method 1300 returns to block 1312 (FIG. 13A). In response to determining that an image is captured that includes a palmprint, method 1300 includes attempting to authenticate the user based on matching the palmprint in the image to stored palmprint biometric data for one or more authorized users (block 1320). Method 1300 includes determining whether the palmprint corresponds to that of an authorized user (decision block 1322). In response to determining that the palmprint does not correspond to that of an authorized user, method 1300 includes presenting notification of a failure to authenticate the user as an authorized user (block 1324). The notification may enable the user to reattempt palmprint capture by repositioning a grip on the communication device or to use an alternate authentication technique. Then method 1300 ends.

In response to determining that the palmprint is authenticated as corresponding to an authorized user, method 1300 includes enabling one or more function(s) that are associated with the corresponding authorized person such as extending the blade assembly and unlocking or activating a user interface presented on the flexible display (block 1326). Then method 1300 ends.

According to aspects of the present disclosure, method 1300 may further include monitoring for a condition in which authentication of a user of an electronic device is required. The electronic device includes a blade assembly slidably coupled to a device housing having an upright orientation. The blade assembly includes a blade, a palmprint scanner, and a flexible display attached to the blade. The palmprint scanner is integrated/attached underneath a portion of the flexible display. The palmprint scanner is sized to cover at least a portion of the back side of the device housing at which a palm of a hand holding the electronic device in the upright orientation can be scanned. Method 1300 may further include triggering the palmprint scanner to scan for an image of a palm holding the electronic device during the condition in which authentication of the user is required. A translation mechanism of the electronic device is operable to slide the blade assembly relative to the device housing between an extended position and a retracted position. The palmprint scanner selectively captures palmprint of a user while the blade assembly is in at least one of a partially retracted position and the retracted position. Method 1300 may further include authenticating the user in response to identifying, from the image, a palmprint corresponding to that of an authorized user. In one or more embodiments, method 1300 may further include unlocking or activating a user interface presented on the flexible display in response to identifying the palmprint in the image as corresponding to the authorized user, thus authenticating the user.

In one or more embodiments, method 1300 may further include determining that an authentication requirement exists while the blade assembly is in an extended position, with the palmprint scanner translated to the front side of the device housing. Method 1300 may further include activating the translation mechanism to position the blade assembly to one of the partially retracted position and the retracted position to translate the palmprint scanner from the front side to the back side of the device housing. Method 1300 may further include initiating monitoring for the image via the palmprint scanner.

In one or more embodiments, method 1300 may further include monitoring at least one sensor configured to detect a user attending to the electronic device. Method 1300 may further include identifying the condition in which authentication of the user is required, based on detecting a change from the user not attending to the electronic device to the user attending to the electronic device. In one or more particular embodiments, method 1300 may further include monitoring the at least one sensor comprising a touch screen of the flexible display configured to detect touch inputs. Method 1300 may further include determining that the user is attending to the electronic device based on receiving touch inputs via the touch screen. In one or more particular embodiments, method 1300 may further include monitoring the at least one sensor comprising a motion sensor. Method 1300 may further include determining that the user is attending to the electronic device based on detecting that the electronic device is moving.

With reference to FIG. 14, method 1400 provides an alternative to the automatic retraction presented at block 1322 (FIG. 13). Method 1400 begins with identifying a precondition that the position of the palmprint scanner does not enable capture of a palmprint on the back side of the device housing (block 1402). Method 1400 includes presenting an indication via the flexible display that corresponds to at least a portion of the palmprint scanner (block 1404). Method 1400 includes activating the at least a portion of the palmprint scanner to capture an image (block 1406). Method 1400 includes presenting an instructional prompt via the flexible display or an audio output device to place one of a palm or a finger against a front side of the device housing (block 1408). Method 1400 includes capturing the image via the palmprint scanner (block 1410). Then method 1400 ends.

With reference to FIG. 15, method 1500 may include monitoring for a request for authentication from an application executed by the communication device (block 1502). Method 1500 includes determining whether a request for authentication is received (decision block 1504). In response to determining that the request for authentication is received, method 1500 includes identifying a requirement to authenticate a user (block 1506). Then method 1500 ends.

In response to determining that the request for authentication is not received, method 1500 may include identifying a condition in which identification is required based in part on determining that the communication device was first left unattended. While being left unattended, the communication device may not necessarily be in the possession of an authorized user. A condition in which identification is required arises when a user is attending to the communication device after a period in which a user is not attending to the communication device. One or more sensors or functional components may indicate whether or not a user is attending to the communication device. In one or more embodiments, method 1500 may include identifying a condition in which authentication of a user is required based on detecting a change from the user not attending to the electronic device to the user attending to the electronic device.

In an example, method 1500 may include monitoring a motion sensor for an indication that the user is attending to the communication device based on detecting that the communication device is moving (block 1508). Method 1500 may include determining whether the communication device is changed from a stationary state to a moving state (decision block 1510). In response to determining that the communication device has changed from a stationary state to a moving state, method 1500 returns to block 1506.

In another example, in response to determining In response to determining that the communication device has not changed from a stationary state to a moving state, method 1500 includes monitoring a touch screen of the flexible display configured to detect touch inputs that indicate a user is attending to the communication device (block 1512). Method 1500 may include determining whether the touch screen has changed an untouched state to a touched state (decision block 1514). In response to determining that the touch screen has changed from the untouched state to the touched state, method 1500 returns to block 1506. In response to determining that the touch screen has not changed from changed from the untouched state to the touched state, method 1500 ends.

With reference to FIG. 16A, method 1600 begins with identifying a precondition that a requirement exists for authenticating a user of the communication (block 1602). Method 1600 includes triggering the palmprint scanner to scan for an image of a palm holding the communication device (block 1604). Method 1600 includes determining whether an image is captured that includes at least a partial palmprint (decision block 1606). In one or more embodiments, a partial palmprint includes fewer identifying features than a feature threshold required for an accurate match. In one or more embodiments, a partial palmprint is an edge area of the palm that is not captured in the authentication data for a palmprint centered on the palmprint scanner. In response to determining that an image is not captured that includes at least a partial palmprint, in one or more embodiments, method 1600 includes determining any unscanned areas of the back side of the device housing that could be scanned by repositioning the blade assembly ("unscanned but scannable areas") (block 1608). Method 1600 includes determining whether an unscanned but scannable area remains to be scanned (decision block 1610). In response to determining that a unscanned but scannable area of the back side of the device housing remains to be scanned, method 1600 includes activating the translation mechanism to position the flexible section of the blade assembly to the unscanned but scannable area of the back side of the device housing (block 1612). Method 1600 returns to block 1604. In response to determining that no unscanned but scannable areas of the back side of the device housing remain to be scanned, in one or more embodiments, method 1600 includes activating the translation mechanism to position the blade assembly to a default position (block 1614). Method 1600 includes presenting (e.g., aural, visual, and tactile) one or more of a failure notification, directions for palm positions, and instructions for palm positioning (block 1616). Method 1600 returns to block 1604). Examples of notification, directions and instructions are provided above with regard to FIG. 3A.

In response to determining that an image captured includes at least a partial palmprint in decision block 1606, method 1600 proceeds to decision block 1618 of FIG. 16B. With reference to FIG. 16B, method 1600 includes determining whether the at least partial palmprint is a full palmprint (decision block 1618). In response to determining that the at least partial palmprint is a full palmprint, in one or more embodiments, method 1600 includes presenting a success notification of capturing the full palmprint (block 1620). Method 1600 includes attempting to authenticate the user based on matching the full palmprint in the image to stored palmprint biometric data for one or more authorized users (block 1622). Method 1600 includes determining whether the palmprint corresponds to that of an authorized user (decision block 1624). In response to determining that the full palmprint does not correspond to that of an authorized user, method 1600 includes presenting notification of a failure to authenticate the user as an authorized user (block 1626). Then method 1600 ends. In response to determining that the full palmprint is authenticated as corresponding to an authorized user, method 1600 includes enabling one or more function(s) that are associated with the corresponding authorized person such as extending the blade assembly and unlocking or activating a user interface presented on the flexible display (block 1628). Then method 1600 ends.

In response to determining that the at least a partial palmprint is not a full palmprint in decision block 1618, method 1600 includes identifying a position of the palm of the user based on a current position of the palmprint scanner and a portion of the palmprint scanner that detected the partial palmprint (block 1630). Method 1600 includes determining whether translating the blade assembly would enable capturing a full palmprint based on the position of the palm and available repositioning capability of the blade assembly (decision block 1632) In response to determining that translating the blade assembly enables capturing the full palmprint, method 1600 includes activating the translation mechanism to position the palmprint scanner of the blade assembly to the position of the palm (block 1634). Then method 1600 returns to block 1604 (FIG. 16A).

In response to determining that translating the blade assembly does not enable capturing the full palmprint, method 1600 includes presenting directional instructions (e.g., aurally, visually) indicating a direction to move the palm of the user from a current position to be aligned with the palmprint scanner (block 1636). In an example, the directional instructions may include one of: (i) move your palm to the right; (ii) move you palm to the left; (iii) move your palm down; (iv) move your palm up; (iv) move palm up and to the left; (v) move your palm up and to the right; (vi) move your palm down and to the left; and (vii) move your palm down and to the right. In another example, the direction instructions may further include an amount of movement such as "two inches" or "four centimeters". In an additional example, the directional instructions may include guidance to flatten the palm against the blade assembly. Then method 1600 returns to block 1604 (FIG. 16A).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a device housing having a front side and a back side and an upright orientation;
   a blade assembly slidably coupled to the device housing, the blade assembly comprising a blade, a palmprint scanner, and a flexible display attached to the blade;
   the palmprint scanner integrated/attached underneath a portion of the flexible display, the palmprint scanner sized to cover at least a portion of the back side of the device housing at which a palm of a hand holding the electronic device in the upright orientation can be scanned;
   a translation mechanism operable to slide the blade assembly relative to the device housing between an extended position and a retracted position, the palmprint scanner selectively capturing a palmprint of a user while the blade assembly is in at least one of a partially retracted position and the retracted position; and
   a controller communicatively coupled to the blade assembly and the translation mechanisms, and which is configured to:
      trigger the palmprint scanner to scan for an image of a palm holding the electronic device in response to determining that authentication of a user is required;
      in response to determining that a palmprint is not detected in the image:
         activate the translation mechanism to reposition the blade assembly; and
         trigger the palmprint scanner to scan for an image of the palm holding the electronic device; and
      authenticate the user in response to identifying, from the image, a palmprint corresponding to an authorized user.

2. The electronic device of claim 1, wherein the controller is configured to:
   determine that authentication is required while the blade assembly is in an extended position, with the palmprint scanner translated to the front side of the device housing;
   activate the translation mechanism to position the blade assembly to one of the partially retracted position and the retracted position to translate the palmprint scanner from the front side to the back side of the device housing; and
   initiate monitoring for the image via the palmprint scanner.

3. The electronic device of claim 1, wherein the controller is configured to:
   determine that authentication is required while the blade assembly is in an extended position with the palmprint scanner translated to the front side of the device housing;
   present a prompt via the flexible display to place one of a palm and a finger against the front side of the device housing in response to determining that the palmprint scanner is translated onto the front side while the blade assembly is in the extended position;
   capture the image containing a corresponding palmprint or fingerprint via the palmprint scanner; and
   authenticate the user based on the one of the palmprint and fingerprint corresponding to the authorized user.

4. The electronic device of claim 1, wherein the controller is configured to unlock or activate a user interface presented on the flexible display in response to authenticating the user by identifying the palmprint in the image as corresponding to the authorized user.

5. The electronic device of claim 1, further comprising at least one sensor communicatively coupled to the controller and configured to detect a user attending to the electronic device, and wherein the controller identifies a condition in which authentication of the user is required, based on detecting a change from the user not attending to the electronic device to the user attending to the electronic device.

6. The electronic device of claim 1, further comprising at least one output device communicatively coupled to the controller, and wherein the controller is configured to:
   in response to determining that a palmprint is not detected in the image:
      present a notification via the at least one output device indicating a failure to detect a palmprint, wherein the notification comprises directions or instructions configured to prompt repositioning of the palm of a user; and
      trigger the palmprint scanner to scan for an image of the palm holding the electronic device.

7. A method comprising:
monitoring, by a controller of an electronic device, for a requirement to authenticate a user of the electronic device, the electronic device comprising a blade assembly slidably coupled to a device housing having an upright orientation, the blade assembly comprising a blade, a palmprint scanner, and a flexible display attached to the blade, the palmprint scanner integrated/attached underneath a portion of the flexible display, the palmprint scanner sized to cover at least a portion of a back side of the device housing at which a palm of a hand holding the electronic device in the upright orientation can be scanned;
triggering the palmprint scanner to scan for an image of a palm holding the electronic device in response to the requirement to authenticate the user, a translation mechanism operable to slide the blade assembly relative to the device housing between an extended position and a retracted position, the palmprint scanner selectively capturing palmprint of a user while the blade assembly is in at least one of a partially retracted position and the retracted position;
in response to determining that a palmprint is not detected in the image:
activating the translation mechanism to reposition the blade assembly; and
triggering the palmprint scanner to scan for an image of the palm holding the electronic device; and
authenticating the user in response to identifying, from the image, a palmprint corresponding to an authorized user.

8. The method of claim 7, further comprising:
determining that an authentication requirement exists while the blade assembly is in an extended position, with the palmprint scanner translated to a front side of the device housing;
activating the translation mechanism to position the blade assembly to one of the partially retracted position and the retracted position to translate the palmprint scanner from the front side to the back side of the device housing; and
initiating monitoring for the image via the palmprint scanner.

9. The method of claim 7, further comprising:
determining that an authentication requirement exists while the blade assembly is in an extended position with the palmprint scanner translated to a front side of the device housing;
presenting a prompt via the flexible display to place one of a palm or a finger against a front side of the device housing in response to determining that the palmprint scanner is translated onto the front side while the blade assembly is in the extended position;
capturing the image containing a corresponding palmprint and fingerprint via the palmprint scanner; and
authenticating the user based on the one of the palmprint and fingerprint corresponding to the authorized user.

10. The method of claim 7, further comprising unlocking or activating a user interface presented on the flexible display in response to authenticating the user by identifying the palmprint in the image as corresponding to the authorized user.

11. The method of claim 7, further comprising:
monitoring at least one sensor configured to detect a user attending to the electronic device; and
identifying a condition in which authentication of the user is required, based on detecting a change from the user not attending to the electronic device to the user attending to the electronic device.

12. The method of claim 7, further comprising:
in response to determining that a palmprint is not detected in the image:
presenting a notification via at least one output device indicating a failure to detect a palmprint, wherein the notification comprises directions or instructions configured to prompt repositioning of the palm of the user; and
triggering the palmprint scanner to scan for an image of the palm holding the electronic device.

13. A computer program product comprising:
a non-transitory computer readable storage device; and
program code on the computer readable storage device that when executed by a processor associated with an electronic device, the program code enables the electronic device to provide functionality of:
monitoring for a requirement to authenticate a user of the electronic device, the electronic device comprising a blade assembly slidably coupled to a device housing having an upright orientation, the blade assembly comprising a blade, a palmprint scanner, and a flexible display attached to the blade, the palmprint scanner integrated/attached underneath a portion of the flexible display, the palmprint scanner sized to cover at least a portion of a back side of the device housing at which a palm of a hand holding the electronic device in the upright orientation can be scanned;
triggering the palmprint scanner to scan for an image of a palm holding the electronic device in response to the requirement to authenticate the user, a translation mechanism operable to slide the blade assembly relative to the device housing between an extended position and a retracted position, the palmprint scanner selectively capturing palmprint of a user while the blade assembly is in at least one of a partially retracted position and the retracted position;
in response to determining that a palmprint is not detected in the image:
activating the translation mechanism to reposition the blade assembly; and
triggering the palmprint scanner to scan for an image of the palm holding the electronic device; and
authenticating the user in response to identifying, from the image, a palmprint corresponding to an authorized user.

14. The computer program product of claim 13, wherein the program code enables the electronic device to provide the functionality of:
determining that an authentication requirement exists while the blade assembly is in an extended position, with the palmprint scanner translated to a front side of the device housing;
activating the translation mechanism to position the blade assembly to one of the partially retracted position and the retracted position to translate the palmprint scanner from the front side to the back side of the device housing; and
initiating monitoring for the image via the palmprint scanner.

15. The computer program product of claim 13, wherein the program code enables the electronic device to provide the functionality of:

determining that an authentication requirement exists while the blade assembly is in an extended position with the palmprint scanner translated to a front side of the device housing;

presenting a prompt via the flexible display to place one of a palm or a finger against a front side of the device housing in response to determining that the palmprint scanner is translated onto the front side while the blade assembly is in the extended position;

capturing the image containing a corresponding palmprint and fingerprint via the palmprint scanner; and authenticating the user based on the one of the palmprint and fingerprint corresponding to the authorized user.

16. The computer program product of claim 13, wherein the program code enables the electronic device to provide the functionality of:

unlocking or activating a user interface presented on the flexible display in response to authenticating the user by identifying the palmprint in the image as corresponding to the authorized user;

monitoring at least one sensor configured to detect a user attending to the electronic device; and identifying a condition in which authentication of the user is required, based on detecting a change from the user not attending to the electronic device to the user attending to the electronic device.

17. The computer program product of claim 13, wherein the program code enables the electronic device to provide the functionality of:

in response to determining that a palmprint is not detected in the image:

presenting a notification via at least one output device indicating a failure to detect a palmprint, wherein the notification comprises directions or instructions configured to prompt repositioning of the palm of the user; and triggering the palmprint scanner to scan for an image of the palm holding the electronic device.

\* \* \* \* \*